US012516627B2

(12) United States Patent
Vaidya et al.

(10) Patent No.: US 12,516,627 B2
(45) Date of Patent: Jan. 6, 2026

(54) GAS TURBINE ENGINE

(71) Applicant: General Electric Company, Schenectady, NY (US)

(72) Inventors: Kedar S. Vaidya, Niskayuna, NY (US); Bugra H. Ertas, Niskayuna, NY (US); Arthur W. Sibbach, Boxford, MA (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/007,093

(22) Filed: Dec. 31, 2024

(65) Prior Publication Data

US 2025/0215826 A1    Jul. 3, 2025

Related U.S. Application Data

(63) Continuation-in-part of application No. 17/981,219, filed on Nov. 4, 2022, now Pat. No. 12,276,228.

(30) Foreign Application Priority Data

Jul. 27, 2022    (IN) .............................. 202211043036

(51) Int. Cl.
*F01D 15/12*    (2006.01)
*F02C 7/06*    (2006.01)
*F02C 7/36*    (2006.01)

(52) U.S. Cl.
CPC .................. *F02C 7/06* (2013.01); *F02C 7/36* (2013.01); *F05D 2240/50* (2013.01); *F05D 2260/40311* (2013.01); *F05D 2260/98* (2013.01)

(58) Field of Classification Search
CPC .... F02C 7/36; F02C 7/06; F05D 2260/40311; F05D 2240/54; F16H 1/28; F16H 2057/085; F16H 57/082; F16C 2360/23
(Continued)

(56) References Cited

U.S. PATENT DOCUMENTS

| 4,845,483 A | 7/1989 | Negishi |
| 4,987,974 A | 1/1991 | Crouch |

(Continued)

FOREIGN PATENT DOCUMENTS

| FR | 3084427 B1 | 3/2021 |
| FR | 3127024 A1 | 3/2023 |

(Continued)

*Primary Examiner* — Logan M Kraft
*Assistant Examiner* — James J Kim
(74) *Attorney, Agent, or Firm* — Klarquist Sparkman, LLP

(57) ABSTRACT

A gas turbine engine includes a gear assembly including planet gears arranged in a planetary configuration. Each planet gear includes a pin, a gearbox bearing, and a planet gear rim. An inner surface of the planet gear rim and an outer surface of the pin define a clearance therebetween that is greater than zero when radial, pinch, tangential, and centrifugal component forces are applied to the planet gear. Each planet gear includes a pin clearance parameter greater than or equal to zero rpm and less than or equal to 3,334 rpm. The gas turbine engine includes a primary lubrication system and an auxiliary lubrication system. The primary lubrication system supplies lubricant to the gearbox bearing of at least one planet gear during normal operation of the gas turbine engine. The auxiliary lubrication system supplies lubricant when the primary lubrication system is unable to supply lubricant.

20 Claims, 11 Drawing Sheets

(58) Field of Classification Search
USPC .................................................. 415/122.1
See application file for complete search history.

(56) References Cited

U.S. PATENT DOCUMENTS

| | | | |
|---|---|---|---|
| 5,119,905 A | 6/1992 | Murray | |
| 5,694,765 A | 12/1997 | Hield et al. | |
| 5,845,483 A | 12/1998 | Petrowicz | |
| 7,662,059 B2 | 2/2010 | McCune | |
| 7,815,536 B2 | 10/2010 | Jansen et al. | |
| 7,841,961 B2 | 11/2010 | Shimizu et al. | |
| 7,849,668 B2 | 12/2010 | Sheridan | |
| 7,883,438 B2 | 2/2011 | McCune | |
| 8,007,253 B2 | 8/2011 | Dooley | |
| 8,298,108 B2 | 10/2012 | Nishida et al. | |
| 8,307,626 B2 | 11/2012 | Sheridan | |
| 8,491,435 B2 | 7/2013 | Ghanime et al. | |
| 8,678,937 B2 | 3/2014 | Humes | |
| 8,702,373 B1 | 4/2014 | Valva et al. | |
| 9,086,055 B2 | 7/2015 | Subramaniam et al. | |
| 9,353,848 B2 | 5/2016 | Blewett et al. | |
| 9,879,773 B2 | 1/2018 | Slayter et al. | |
| 9,903,227 B2 | 2/2018 | Cigal | |
| 10,167,873 B2 | 1/2019 | Sheridan et al. | |
| 10,208,624 B2 | 2/2019 | Duong et al. | |
| 10,228,024 B2 * | 3/2019 | Hallman | F16C 33/581 |
| 10,267,233 B2 | 4/2019 | Mastro | |
| 10,267,365 B2 | 4/2019 | Hasting | |
| 10,316,855 B2 | 6/2019 | Mastro | |
| 10,371,007 B2 | 8/2019 | Cigal et al. | |
| 10,487,917 B2 | 11/2019 | Chmylkowski | |
| 10,508,731 B2 * | 12/2019 | Hallman | F16H 1/28 |
| 10,513,949 B2 | 12/2019 | Parnin et al. | |
| 10,526,913 B2 | 1/2020 | Roberge | |
| 10,533,451 B2 | 1/2020 | Klaus | |
| 10,570,824 B2 | 2/2020 | Schwarz et al. | |
| 10,577,974 B2 | 3/2020 | Valva et al. | |
| 10,634,053 B2 | 4/2020 | Schwarz et al. | |
| 10,746,188 B2 | 8/2020 | MacFarlane et al. | |
| 10,801,413 B2 | 10/2020 | Roberge | |
| 10,801,609 B2 * | 10/2020 | Lemoine | B23P 19/04 |
| 10,823,084 B1 * | 11/2020 | Spruce | F02C 7/36 |
| 10,882,629 B2 | 1/2021 | Hartshorn et al. | |
| 10,954,999 B2 | 3/2021 | El-Shafei | |
| 11,092,037 B2 | 8/2021 | Valva et al. | |
| 2011/0168494 A1 | 7/2011 | Subramaniam et al. | |
| 2011/0212808 A1 | 9/2011 | Pabst | |
| 2019/0376416 A1 | 12/2019 | Mastro | |
| 2019/0383168 A1 | 12/2019 | Valva et al. | |

FOREIGN PATENT DOCUMENTS

| | | |
|---|---|---|
| FR | 3127025 A1 | 3/2023 |
| FR | 3129436 A1 | 5/2023 |
| FR | 3129690 A1 | 6/2023 |
| FR | 3130747 A1 | 6/2023 |
| FR | 3130875 A1 | 6/2023 |
| GB | 2234035 B | 5/1993 |

* cited by examiner

| Gear Assembly 204 | Gear Ratio (GR) | Fan Horsepower (HP$_{fan}$) | Fan Speed ($\Omega_{fan}$) (rpm) | Number of Planet Gears 208 (N$_p$) | Planet Gear Bending Stress Neutral Axis Radius 708 (f$_p$) (in.) | Clearance 718 (cr) (mils) | Pin Clearance Parameter (PCP) (rpm) |
|---|---|---|---|---|---|---|---|
| Gear Assembly #1 | 3 | 8000 | 2933 | 3 | 2 | 3.75 | 87 |
| Gear Assembly #2 | 3.5 | 30000 | 2629 | 5 | 2.84 | 1.19 | 576 |
| Gear Assembly #3 | 3.2 | 25000 | 2813 | 4 | 3 | 2.25 | 866 |
| Gear Assembly #4 | 3 | 29000 | 3333 | 5 | 2.5 | 1.25 | 1291 |

FIG. 10

| Parameter | Range(s) |
|---|---|
| Pin Clearance Parameter (PCP) | 0 rpm–3,334 rpm<br>0 rpm–3,000 rpm<br>48 rpm–3,000 rpm<br>48 rpm–1,334 rpm<br>80 rpm–1,300 rpm |
| Gear Ratio (GR) | 3–5 |
| Clearance 718 ($c_r$) | 0.00075"–0.012" |
| Planet Gear Bending Stress Neutral Axis Radius 708 ($r_p$) | 1.5"–4.0" |
| Number of Planet Gears 208 ($N_p$) | 3–6 |
| Fan Horsepower ($HP_{fan}$) | 7,000 hp–80,000 hp |
| Fan Speed ($\Omega_{fan}$) | 1,600 rpm–3,334 rpm |
| First Constant ($K_1$) | $1.96 \times 10^5 \frac{1}{\text{hp.min.in}}$ |
| Second Constant ($K_2$) | $4.91 \times 10^{-9} \frac{\text{hp.min}^3}{\text{in}^3}$ |

FIG. 11

GAS TURBINE ENGINE

CROSS-REFERENCE TO RELATED APPLICATIONS

This application is a continuation-in-part of U.S. patent application Ser. No. 17/981,219, filed Nov. 4, 2022, which claims the benefit of Indian Patent Application No. 202211043036, filed Jul. 27, 2022, each of which is incorporated by reference herein in its entirety.

FIELD

The present disclosure relates to lubricated gearbox bearings for a gas turbine engine.

BACKGROUND

Aircraft engines typically include a fan, a low pressure compressor, and a low pressure turbine rotationally coupled in a series configuration by a low pressure shaft. The low pressure shaft is rotationally coupled to the low pressure turbine and a power gear box. The power gear box includes a plurality of planet gears and is rotationally coupled to the low pressure fan and the low pressure compressor. Each planet gear surrounds a gearbox bearing.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, or structurally similar elements.

FIG. 10 shows exemplary pin clearance parameters for exemplary gear assemblies, according to one example.

FIG. 11 shows exemplary ranges of values for gear assembly characteristics, according to one example.

DETAILED DESCRIPTION

Figure 1:
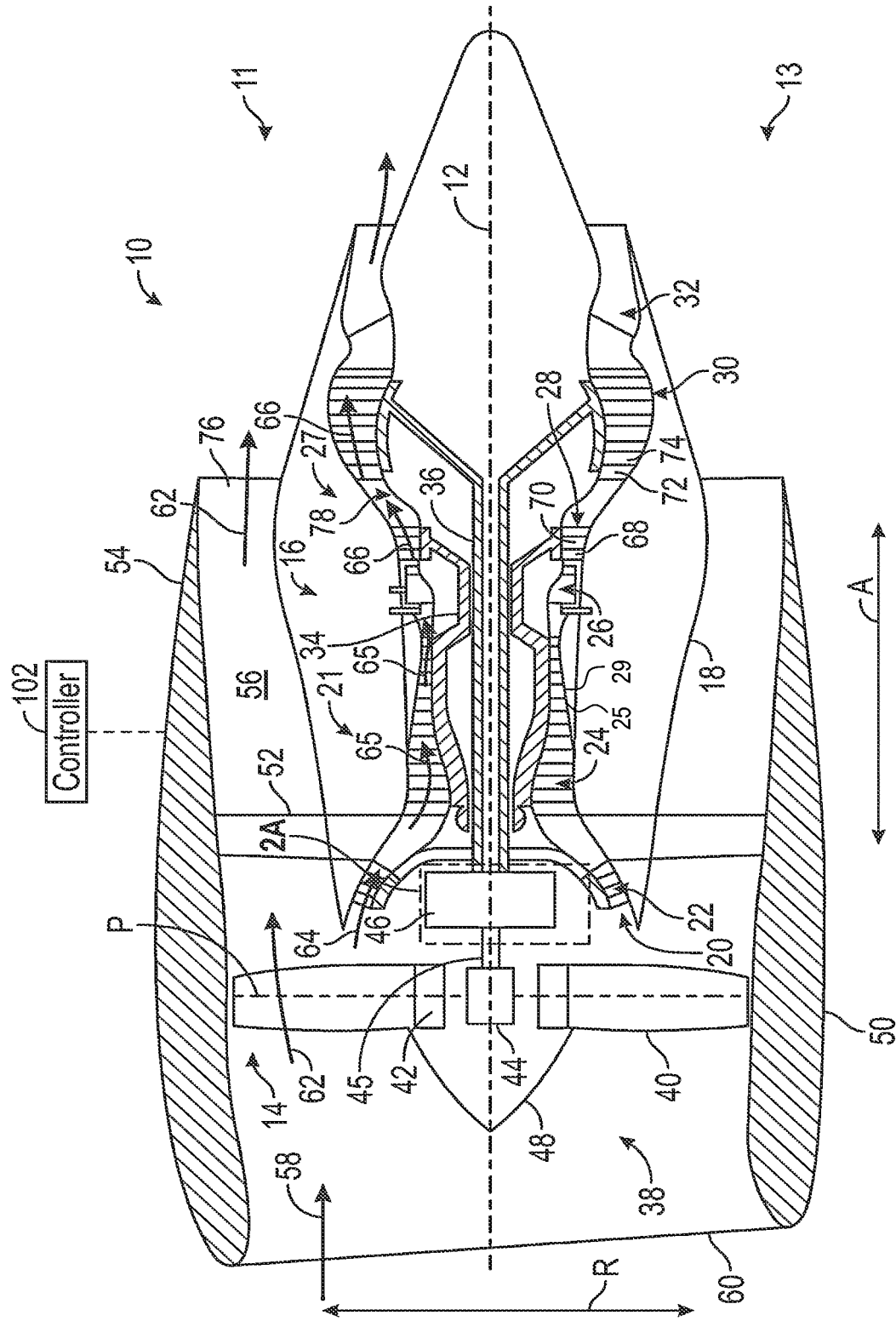
FIG. 1 is a schematic cross-sectional diagram of a gas turbine engine, taken along a longitudinal centerline axis of the gas turbine engine, according to the present disclosure.

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatuses, and systems are not limited to any specific aspect or feature or combination thereof, nor do the disclosed embodiments require that any one or more specific advantages be present or problems be solved.

Features and characteristics described in conjunction with a particular aspect, embodiments, or examples are to be understood to be applicable to any other aspect, embodiment, or example described herein unless incompatible therewith. A person having ordinary skill in the relevant art will recognize that any of the features disclosed in this specification (including any accompanying claims, abstract and drawings), and/or all of the steps of any method or process so disclosed, may be combined in any combination, except combinations where at least some of such features and/or steps are mutually exclusive.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are relatively discernable by one of ordinary skill in the art.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise. That is, if two of a particular element are present, one of these elements is also present and thus "an" element is present. The terms "a plurality of" and "plural" mean two or more of the specified element.

As used herein, the term "and/or" used between the last two of a list of elements means any one or more of the listed elements. For example, the phrase "A, B, and/or C" means "A," "B," "C," "A and B," "A and C," "B and C" or "A, B, and C."

As used herein, the terms "first," "second," and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a gas turbine engine or vehicle, and refer to the normal operational attitude of the gas turbine engine or vehicle. For example, with regard to a high-bypass turbine engine, forward refers to a position closer to an engine inlet and aft refers to a position closer to an engine nozzle or exhaust. In one example, in a reverse flow turbine engine, forward refers to a position closer to the engine nozzle or exhaust and aft refers to a position closer to an engine inlet.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

As used herein, "normal operation" of a gas turbine engine is intended to mean when the gas turbine engine is operating, and a primary lubrication system of the gas turbine engine is supplying lubricant to one or more rotating components of the gas turbine engine.

As used herein, "takeoff conditions" refer to conditions for the operation of a gas turbine engine at sea-level elevation, standard pressure, extreme hot day temperature, and a flight velocity of up to about 0.25 Mach.

As used herein, "extreme hot day temperature" means the extreme hot day temperature specified for a particular gas turbine engine. This can include the extreme hot day temperature used for engine certification. Extreme hot day temperature can additionally or alternatively include temperatures of about 130-140° F.

As used herein, "journal bearings" include a lubricating fluid film disposed between a rotating component (e.g., a planet gear rim) and a stationary component (e.g., a pin).

As used herein, "windmill" or "windmilling" is a condition when the fan and the low-pressure shaft of the gas turbine engine continue to rotate at low speeds, while the high-pressure shaft rotates slowly or even stops. Windmilling can occur when the gas turbine engine is shut down, but air still flows across the fan, such as during an in-flight engine shutdown or when the gas turbine engine is on the ground and the fan is rotating in the presence of wind when the gas turbine engine is shutdown. During a shutdown, e.g., while the aircraft is on the ground, the fan may also rotate in either direction depending upon the stationary position of the gas turbine engine relative to the ambient wind. Airflow entering the fan exhaust may exit the fan inlet in an opposite direction as a direction of operation and cause the fan to rotate in an opposite rotational direction compared to the intended operational rotational direction.

As used herein, to "activate" an auxiliary lubrication system or "activating" an auxiliary lubrication system includes causing lubricant to flow within the auxiliary lubrication system. For example, activating the auxiliary lubrication system includes powering an auxiliary pump to pump the lubricant through the auxiliary lubrication system or closing a drain valve or a scavenge valve to fill a secondary reservoir with the lubricant. In some embodiments, the drain valve or the scavenge valve is opened when the auxiliary lubrication system is active, and another valve closes to fill the secondary reservoir with lubricant.

As used herein, to "inactivate" an auxiliary lubrication system or an "inactive" auxiliary lubrication system includes preventing the lubricant from flowing within the auxiliary lubrication system. For example, when the auxiliary lubrication system is inactive, the auxiliary pump is powered off and is prevented from pumping the lubricant through the auxiliary lubrication or the drain valve is opened to prevent the secondary reservoir from being filled with the lubricant. In some embodiments, the drain valve or the scavenge valve is closed when the auxiliary lubrication system is inactive, and another valve opens to prevent the secondary reservoir from being filled with the lubricant.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified. In at least some instances, the approximating language may correspond to the precision of an instrument for measuring the value, or the precision of the methods or the machines for constructing the components or the systems or manufacturing the components or the systems. For example, the approximating language may refer to being within a one, a two, a four, a ten, a fifteen, or a twenty percent margin in either individual values, range(s) of values or endpoints defining range(s) of values.

The present disclosure provides for a gas turbine engine including a gearbox assembly. The gas turbine engine includes a fan having a fan shaft. The gas turbine engine includes one or more rotating components that rotate within the gas turbine engine. The one or more rotating components can include, for example, one or more shafts, one or more gears, or one or more bearings including one or more engine bearings for the one or more shafts of the gas turbine engine (e.g., a low-pressure shaft or a high-pressure shaft) or one or more gearbox bearings for the gearbox assembly.

The gearbox assembly of the gas turbine engine can include a plurality of gears—including a sun gear, a ring gear, a carrier, and a plurality of planet gears—arranged in a planetary configuration. Each of the planet gears can include a bearing pin and a planet gear rim rotatable around the bearing pin. One or more of the bearing pins can include a gearbox bearing to facilitate the rotation of the planet gear. One or more of the gearbox bearings can be a journal bearing, e.g., a hydrodynamic journal bearing.

A clearance exists between an outer surface of the pin and an inner surface of the planet gear rim. The clearance is sized such that the clearance is greater than zero when a radial component force, a pinch component force, a tangential component force, and a centrifugal component force are applied to the planet gear, thereby reducing the likelihood of metal-to-metal contact between the pin and the planet gear rim, e.g., during operation of the gas turbine engine. The clearance is further sized to maintain a desired pressure of the lubricant disposed between the outer surface of the pin and the inner surface of the planet gear rim, thereby beneficially reducing a stiffness of the journal bearing disposed within the planet gear.

The gas turbine engine can further include a lubrication system for supplying lubricant (e.g., oil) to the above-described planet gears and/or the gearbox bearings disposed within the rotating planet gears. Although reference throughout this application is primarily made to lubrication systems for lubricating the planet gears and/or gearbox bearings, the lubrication systems disclosed herein can be used to additionally supply the lubricant to other rotating components of the gas turbine engine (e.g., the one or more shafts, the sun gears, the ring gears, or the one or more engine bearings).

The lubrication system includes one or more tanks that store lubricant therein, and a primary lubrication system having a primary pump and a primary lubricant supply line. During normal operation of the gas turbine engine, the primary pump pumps the lubricant from the one or more tanks to the planet gears and/or the gearbox bearings through the primary lubricant supply line.

The gearbox bearings (e.g., hydrodynamic journal bearings) typically require a steady supply of lubricant during all operational phases of the gas turbine engine to properly lubricate the bearings. Proper lubrication helps prevent damage to the bearings and thus also helps prevent damage to the planet gears. The shafts of the gas turbine engine may experience long duration, continued rotation following a shutdown of the gas turbine engine, such as that occurring during windmilling. In such instances, the planet gears and/or gearbox bearings can be affected by not receiving enough lubricant. For example, during windmilling, the rotational speed of the shafts may be too low to power the primary pump to pump the lubricant to the planet gears and/or gearbox bearings. In some instances, e.g., during operation of the gas turbine engine (e.g., in-flight), the lubrication system may lose pressure (e.g., due to a failure of the primary pump or other components of the primary lubrication system), such that the primary lubrication system is unable to provide the lubricant to the planet gears and/or gearbox bearings via the primary pump and the primary lubricant supply line.

Lubricant interruptions are especially serious for journal bearings (and thus planet gears with journal bearings), since the absence of lubricant at the journal bearings can lead to a journal bearing failure and subsequent gearbox failure, which may cause the low-speed shaft to lock up permanently. Such a failure of the journal bearings is referred to as a "journal bearing seizure" and occurs when there is direct contact between a surface of the journal bearing and another surface (e.g., another surface of the journal bearing, the inner surface of the planet gear rim, etc.) thereby causing a significant increase of wear and friction that leads to bearing failure. If metal-to-metal contact occurs during high-power operation, the surfaces can become welded together due to the high temperature from the friction.

Some turbine engines include an auxiliary lubrication system that includes an auxiliary pump to supply lubricant to the planet gears and/or gearbox bearings (and other rotating components) to prevent damage to the planet gears and/or gearbox bearings due to inadequate lubricant supply during windmilling. Such auxiliary lubrication systems, however, typically operate based on a speed of the fan such that the auxiliary lubrication system operates only when the fan speed is below a threshold speed, such as during a shutdown of the gas turbine engine. Such auxiliary lubrication systems may be unable to operate to supply the lubricant to the planet gears and/or gearbox bearings during operation of the gas turbine engine, for example, when the gas turbine engine is operating (e.g., the fan speed is greater than the threshold speed), and the primary lubrication system is unable to provide the lubricant to the planet gears and/or gearbox bearings. Further, the auxiliary pump requires added complexity to provide the lubricant during high speeds, such as during operation of the gas turbine engine, and during low speeds, such as during windmilling (e.g., in-flight or on the ground). Further, the auxiliary pump requires added complexity to provide the lubricant while the fan windmills in either direction (e.g., the fan rotates clockwise or counterclockwise).

Some auxiliary lubrication systems are always active such that the lubricant flows through the auxiliary lubrication system and a valve directs the lubricant either to the primary lubrication system or to the gearbox assembly. Such a configuration of the auxiliary lubrication system being always active, however, requires running the auxiliary pump during operation of the gas turbine engine, thereby reducing a lifespan of the auxiliary pump. Such auxiliary lubrication systems may also overflow the planet gears and/or gearbox bearings (e.g., hydrodynamic journal bearings) by supplying too much lubricant, thereby introducing inefficiencies of these components.

Accordingly, the present disclosure provides an auxiliary lubrication system that supplies the lubricant to at least one of the planet gears and/or gearbox bearings (and, in some examples, other rotating components of the gas turbine engine) during any time that the primary lubrication system is unable to supply the lubricant. The auxiliary lubrication system includes an auxiliary reservoir that stores the lubricant therein and a lubricant dispersion device. The lubricant dispersion device, also referred to as a scupper or a splasher, is a mechanical device that is drivingly coupled to the gearbox assembly (e.g., at least one component thereof). The lubricant dispersion device collects the lubricant in the auxiliary reservoir and disperses (e.g., splashes) the lubricant onto at least one of the planet gears and/or gearbox bearings during windmilling of the fan or during other conditions in which the primary lubrication system is unable to supply the lubricant to the planet gears and/or gearbox bearings. The lubricant dispersion device operates regardless of the rotational direction of the fan (e.g., clockwise or counterclockwise). In some embodiments, the lubricant dispersion device includes a gear assembly such that the lubricant dispersion device is coupled to the gearbox assembly through the gear assembly. The gear assembly increases a rotational speed of the lubricant dispersion device from a rotational speed of the gears of the gearbox assembly. In some embodiments, the gear assembly has a gear ratio of greater than or equal to 10:1 such that the rotational speed of the lubricant dispersion device is greater than or equal to ten times the rotational speed of the gears. In this way, the lubricant dispersion device disperses the lubricant from the auxiliary reservoir to the planet gears and/or gearbox bearings (and, in some examples, additionally to other rotating components) even if the rotational speed of the gears is low. The lubricant dispersion device can operate regardless of the rotational direction of the fan (e.g., clockwise or counterclockwise). For example, the lubricant dispersion device collects the lubricant in the auxiliary reservoir and disperses the lubricant if the fan is rotating in a first rotational direction and if the fan is rotating in a second rotational direction.

The auxiliary lubrication system may include a clutch that engages or disengages the lubricant dispersion device. The clutch engages or disengages the lubricant dispersion device based on a pressure of the lubricant in the primary lubricant system. For example, the clutch disengages the lubricant dispersion device such that the lubricant dispersion device does not rotate when the pressure of the lubricant in the primary lubrication system is greater than a primary pressure threshold. The clutch engages the lubricant dispersion device such that the lubricant dispersion device rotates when the pressure of the lubricant in the primary lubrication system is less than the primary pressure threshold. Accordingly, the auxiliary lubrication system supplies the lubricant to at least one of the planet gears and/or gearbox bearings (and, in some examples, additionally to other rotating components) while the gas turbine engine is operating and if the primary lubrication system fails, and can no longer supply the lubricant to the one or more rotating components.

Disclosed herein is a gas turbine engine 10 for an aircraft. The gas turbine engine 10 is configured to produce power—herein referred to as "fan power"—in a range from and including 7,000 horsepower to and including 80,000 horsepower at takeoff conditions.

Referring now to the drawings, FIG. 1 is a schematic cross-sectional diagram of the gas turbine engine 10, taken along a longitudinal centerline axis 12 of the gas turbine engine 10, according to an embodiment of the present disclosure. As shown in FIG. 1, the gas turbine engine 10 defines an axial direction A (extending parallel to the longitudinal centerline axis 12 provided for reference) and a radial direction R that is normal to the axial direction A. In the orientation of FIG. 1, portions of the gas turbine engine 10 above the longitudinal centerline axis 12 are referred to as a top portion 11 and portions of the gas turbine engine 10 below the longitudinal centerline axis 12 are referred to as a bottom portion 13. The gas turbine engine 10 may be viewed with respect to a "clock" orientation having a twelve o'clock position, a three o'clock position, a six o'clock position, and a nine o'clock position, when viewed from a forward view of the gas turbine engine 10 (e.g., annular about the longitudinal centerline axis 12). Although not provided with reference numerals, the clock orientation is understood to include all clock positions therebetween. The twelve o'clock position is positioned at a top of the gas turbine engine 10 (e.g., at the top portion 11), the three o'clock position is positioned ninety degrees (90°) from the twelve o'clock position (out of the page in the view of FIG. 1), the six o'clock position is positioned at a bottom of the gas turbine engine 10 (e.g., at the bottom portion 13) and is one hundred eighty degrees (180°) from the twelve o'clock position, and the nine o'clock position is positioned ninety degrees (90°) from the six o'clock position (e.g., into the page in the view of FIG. 1).

In general, the gas turbine engine 10 includes a fan section 14 and a turbo-engine 16 disposed downstream from the fan section 14. The turbo-engine 16 includes, in serial flow relationship, a compressor section 21, a combustion section 26, and a turbine section 27. The turbo-engine 16 is substantially enclosed within an outer casing 18 that is substantially tubular and defines an annular inlet 20. As schematically shown in FIG. 1, the compressor section 21 includes a booster or a low pressure (LP) compressor 22 followed downstream by a high pressure (HP) compressor 24. The combustion section 26 is downstream of the compressor section 21. The turbine section 27 is downstream of the combustion section 26 and includes a high pressure (HP) turbine 28 followed downstream by a low pressure (LP) turbine 30. The turbo-engine 16 further includes a jet exhaust nozzle section 32 that is downstream of the turbine section 27, a high-pressure (HP) shaft 34 or a spool, and a low-pressure (LP) shaft 36. The HP shaft 34 drivingly connects the HP turbine 28 to the HP compressor 24. The HP turbine 28 and the HP compressor 24 rotate in unison through the HP shaft 34. The LP shaft 36 drivingly connects the LP turbine 30 to the LP compressor 22. The LP turbine 30 and the LP compressor 22 rotate in unison through the LP shaft 36. In some examples, the LP shaft 136 (and thus also the LP turbine 30 and the LP compressor 22 rotating in unison with the LP shaft 136) can rotate at a rate from 8,000 rpm to 10,000 rpm at takeoff conditions. The compressor section 21, the combustion section 26, the turbine section 27, and the jet exhaust nozzle section 32 together define a core air flow path.

The HP compressor 24 comprises a plurality of HP compressor stages ("HPC stages") through which combustion gases 65 are routed, wherein each HP compressor stage comprises a plurality of HP compressor rotor blades 25 arranged in a single row and coupled to the HP shaft 34. Each HP compressor stage further comprises a plurality of HP compressor stator vanes 29 arranged in a single row aft of the single row of HP compressor rotor blades 25 and coupled to the outer casing 18. The number of the plurality of HP compressor stages ranges from eight stages to ten stages. In some examples, the HP compressor 24 can have eight, nine, or ten HP compressor stages.

The LP turbine 30 comprises a plurality of LP turbine stages ("LPT stages"), wherein each LP turbine stage comprises a sequence of one row of LP turbine stator vanes 72 arranged behind one row of LP turbine rotor blades 74. The number of LP turbine stages is in a range from three to six. This means that the LP turbine 30 can comprise three, four, five, or six LP turbine stages.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. The fan 38 can have a diameter in the radial direction R in a range from 80 inches to 95 inches. In other examples, the fan diameter can range from 85 inches to 95 inches.

In the case of a variable pitch fan, the plurality of fan blades 40 is rotatable relative to the disk 42 about a pitch axis P by virtue of the fan blades 40 being operatively coupled to an actuation member 44 configured to collectively vary the pitch of the fan blades 40 in unison. The fan blades 40, the disk 42, and the actuation member 44 are together rotatable about the longitudinal centerline axis 12 via a fan shaft 45 that is powered by the LP shaft 36 across a power gearbox, also referred to as a gearbox assembly 46. In this way, the fan 38 is drivingly coupled to, and powered by, the turbo-engine 16, and the gas turbine engine 10 is an indirect drive engine. The gearbox assembly 46 is shown schematically in FIG. 1. The gearbox assembly 46 is a reduction gearbox assembly for adjusting the rotational speed of the fan shaft 45 and, thus, the fan 38 relative to the LP shaft 36 when power is transferred from the LP shaft 36 to the fan shaft 45.

The gas turbine engine 10 can generate significant loads on the LP shaft 36, e.g., during operation of the. Loads on the LP shaft 36 can exert significant forces on a plurality of gears 205 (FIG. 2) within the gearbox assembly 46. These loads include unevenly distributed loads on the journal bearings within the gears. Thus, there exists a need to manage the loads on the power gear box 146 to ensure safe and reliable operation of the power gear box 146.

Referring still to the exemplary embodiment of FIG. 1, the disk 42 is covered by a fan hub 48 that is aerodynamically contoured to promote an airflow through the plurality of fan blades 40. In addition, the fan section 14 includes an annular fan casing or a nacelle 50 that circumferentially surrounds the fan 38 and at least a portion of the turbo-engine 16. The nacelle 50 is supported relative to the turbo-engine 16 by a plurality of outlet guide vanes 52 that are circumferentially spaced about the nacelle 50 and the turbo-engine 16. Moreover, a downstream section 54 of the nacelle 50 extends over an outer portion of the turbo-engine 16, and, with the outer casing 18, defines a bypass airflow passage 56 therebetween.

During operation of the gas turbine engine 10, a volume of air 58 enters the gas turbine engine 10 through an inlet 60 of the nacelle 50 or the fan section 14. As the volume of air 58 passes across the fan blades 40, a first portion of air, also referred to as bypass air 62 is routed into the bypass airflow passage 56, and a second portion of air, also referred to as core air 64, is routed into the upstream section of the core air flow path through the annular inlet 20 of the LP compressor 22. The ratio between the bypass air 62 and the core air 64 is commonly known as a bypass ratio. The pressure of the core air 64 is then increased, generating compressed air 65. The compressed air 65 is routed through the plurality of HP compressor stages of the HP compressor 24 and into the combustion section 26, where the compressed air 65 is mixed with fuel and ignited to generate combustion gases 66.

The combustion gases 66 are routed into the HP turbine 28 and expanded through the HP turbine 28 where a portion of thermal energy or kinetic energy from the combustion gases 66 is extracted via one or more stages of HP turbine stator vanes 68 and HP turbine rotor blades 70 that are coupled to the HP shaft 34. This causes the HP shaft 34 to rotate, thereby supporting operation of the HP compressor 24 (self-sustaining cycle). In this way, the combustion gases 66 do work on the HP turbine 28. The combustion gases 66 are then routed into the LP turbine 30 and expanded through the LP turbine 30. Here, a second portion of the thermal energy or the kinetic energy is extracted from the combustion gases 66 via one or more stages of LP turbine stator vanes 72 and LP turbine rotor blades 74 that are coupled to the LP shaft 36. This causes the LP shaft 36 to rotate, thereby supporting operation of the LP compressor 22 (self-sustaining cycle) and rotation of the fan 38 via the gearbox assembly 46. In this way, the combustion gases 66 do work on the LP turbine 30. In some examples, the rate of rotation of the LP shaft 36 can be proportional to the rate of rotation of the fan 38. The rate of rotation of the fan 38, herein referred to as a "fan speed," can range from 1,600 rpm to 3,334 rpm.

The combustion gases 66 are subsequently routed through the jet exhaust nozzle section 32 of the turbo-engine 16 to provide propulsive thrust. Simultaneously, the bypass air 62 is routed through the bypass airflow passage 56 before being exhausted from a fan nozzle exhaust section 76 of the gas turbine engine 10, also providing propulsive thrust. The HP turbine 28, the LP turbine 30, and the jet exhaust nozzle section 32 at least partially define a hot gas path 78 for routing the combustion gases 66 through the turbo-engine 16.

A controller 102 is in communication with the gas turbine engine 10 for controlling aspects of the gas turbine engine 10. For example, the controller 102 is in two-way communication with the gas turbine engine 10 for receiving signals from various sensors and control systems of the gas turbine engine 10 and for controlling components of the gas turbine engine 10, as detailed further below. The controller 102, or components thereof, may be located onboard the gas turbine engine 10, onboard the aircraft, or can be located remote from each of the gas turbine engine 10 and the aircraft. The controller 102 can be a Full Authority Digital Engine Control (FADEC) that controls aspects of the gas turbine engine 10.

The controller 102 may be a standalone controller or may be part of an engine controller to operate various systems of the gas turbine engine 10. In this embodiment, the controller 102 is a computing device having one or more processors and a memory. The one or more processors can be any suitable processing device, including, but not limited to, a microprocessor, a microcontroller, an integrated circuit, a logic device, a programmable logic controller (PLC), an application specific integrated circuit (ASIC), or a Field Programmable Gate Array (FPGA). The memory can include one or more computer-readable media, including, but not limited to, non-transitory computer-readable media, a computer readable non-volatile medium (e.g., a flash memory), a RAM, a ROM, hard drives, flash drives, or other memory devices.

The memory can store information accessible by the one or more processors, including computer-readable instructions that can be executed by the one or more processors. The instructions can be any set of instructions or a sequence of instructions that, when executed by the one or more processors, cause the one or more processors and the controller 102 to perform operations. The controller 102 and, more specifically, the one or more processors are programmed or configured to perform these operations, such as the operations discussed further below. In some embodiments, the instructions can be executed by the one or more processors to cause the one or more processors to complete any of the operations and functions for which the controller 102 is configured, as will be described further below. The instructions can be software written in any suitable programming language or can be implemented in hardware. Additionally, or alternatively, the instructions can be executed in logically or virtually separate threads on the processors. The memory can further store data that can be accessed by the one or more processors.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The gas turbine engine 10 depicted in FIG. 1 is by way of example only. In other exemplary embodiments, the gas turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, turboprop, or turboshaft engines.

Figure 2:
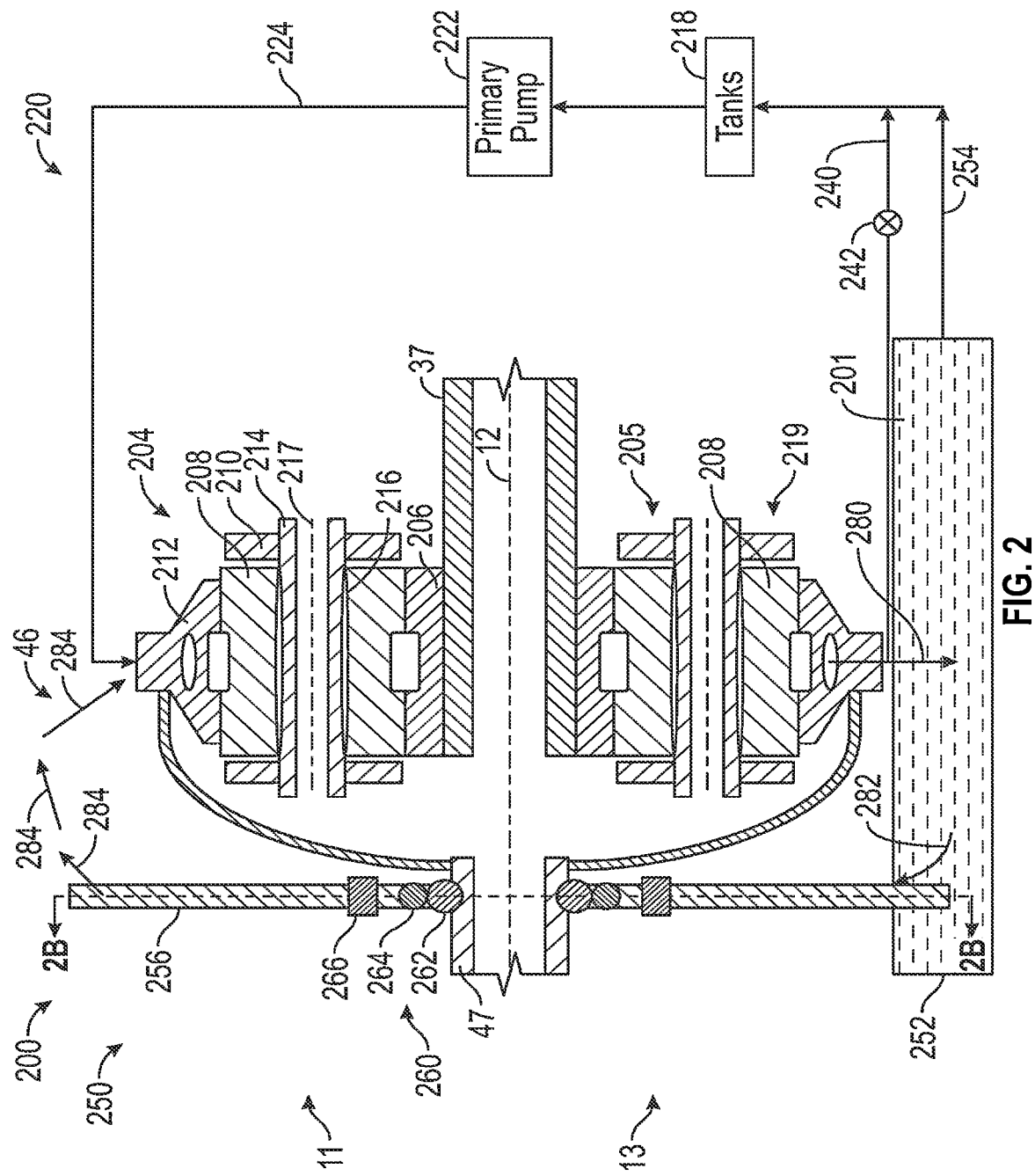
FIG. 2 is a schematic axial end cross-sectional view of a lubrication system for a gearbox assembly for the gas turbine engine of FIG. 1, taken along a latitudinal centerline axis of the gearbox assembly, according to the present disclosure.

FIG. 2 is a schematic axial end cross-sectional view of a lubrication system 200 for the gearbox assembly 46 (FIG. 1), according to the present disclosure. The gearbox assembly 46 includes a gear assembly 204 including a plurality of gears 205 including a sun gear 206, a plurality of planet gears 208 secured by a planet carrier 210, and a ring gear 212. Thus, the gear assembly 204 is an epicyclic gear assembly. FIG. 2 shows two planet gears 208 (e.g., one planet gear 208 in the top portion 11 and one planet gear 208 in the bottom portion 13), but the one or more planet gears 208 can include any number of planet gears 208 (e.g., the three planet gears shown in FIG. 7).

The gear assembly 204 is in a planetary arrangement, in which the ring gear 212 is held fixed, with the planet carrier 210 allowed to rotate. In such an arrangement, the sun gear 206 is coupled to an input shaft 37 (e.g., the LP shaft 36) of the gas turbine engine 10 (FIG. 1), and the planet carrier 210 is coupled to an output shaft 47 (e.g., the fan shaft 45) such that the rotation of the planet carrier 210 causes the output shaft 47, and, thus, the fan 38, to rotate. In this way, the planet carrier 210 is the output of the gear assembly 204.

Each of the one or more planet gears 208 includes a pin 214 disposed therein for coupling each of the one or more planet gears 208 to the planet carrier 210. The one or more planet gears 208 each includes one or more gearbox bearings 216 disposed therein. In some embodiments, the pin 214 can include the gearbox bearing 216. The gearbox bearings 216 facilitate the rotation of the planet gear 208 about a planet gear longitudinal centerline axis 217. In some embodiments, the one or more gearbox bearings 216 can be journal bearings without any rolling elements, e.g., the gearbox bearings 216 can be hydrodynamic journal bearings. The plurality of gears 205 of the gearbox assembly 46 and the one or more gearbox bearings 216 are one or more rotating components 219 of the gas turbine engine 10 (FIG. 1).

The lubrication system 200 includes one or more tanks 218 that store lubricant 201 therein, a primary lubrication system 220, and an auxiliary lubrication system 250. Preferably, the lubricant 201 is oil. The lubricant 201 can be any type of lubricant for lubricating the one or more planet gears 208 and/or gearbox bearings 216 of the gear assembly 204. In some examples, the lubricant 201 can be any type of lubricant for additionally lubricating one or more other rotating components 219, such as, for example, the plurality of gears 205 (e.g., the sun gear 206, the ring gear 212, etc.).

The primary lubrication system 220 includes a primary pump 222 and a primary lubricant supply line 224. The primary pump 222 is in fluid communication with the one or more tanks 218 and the primary lubricant supply line 224. The primary lubricant supply line 224 is in fluid communication with the one or more planet gears 208 and/or gearbox bearings 216 and, in some examples, can additionally be in fluid communication with one or more of the other rotating components 219 (e.g., with the plurality of gears 205). The primary pump 222 pumps the lubricant 201 from the one or more tanks 218 to the one or more planet gears 208 and/or gearbox bearings 216 through the primary lubricant supply line 224, as detailed further below. In some embodiments, the lubrication system 200 supplies the lubricant 201 from the one or more tanks 218 to the one or more planet gears 208 and/or gearbox bearings 216 without a pump, for example, by gravity or by centrifugal force due to rotation of the planet carrier 210 in the planetary arrangement of the gear assembly 204.

The lubrication system 200 includes a primary lubricant return line 240 for returning the lubricant that drains from the one or more planet gears 208 and/or gearbox bearings 216 (and, in some examples, at least one of the other rotating components 219) to the one or more tanks 218. The primary lubricant return line 240, also referred to as a sump line or a scavenge line, is in fluid communication with the one or more planet gears 208 and/or gearbox bearings 216 and with the one or more tanks 218. In this way, the lubricant 201 drains from the one or more planet gears 208 and/or gearbox bearings 216 and the primary lubricant return line 240 operably directs the lubricant 201 to the one or more tanks 218. In some embodiments, the lubrication system 200 includes a sump pump in fluid communication with the one or more planet gears 208 and/or gearbox bearings 216 and the primary lubricant return line 240. The sump pump pumps the lubricant 201 and pumps air within the primary lubricant return line 240 that has leaked into the primary lubricant return line 240 during operation of the gas turbine engine 10 (FIG. 1). The sump pump is a suction pump that generates suction to pull the lubricant 201 or the air through the primary lubricant return line 240 and towards the one or more tanks 218.

The primary lubricant return line 240 includes one or more drain valves 242 within the primary lubricant return line 240. In this way, the one or more drain valves 242 are in fluid communication with the primary lubrication system 220. The one or more drain valves 242 are in communication with the controller 102 (FIG. 1). The controller 102 controls the one or more drain valves 242 to open and to close the one or more drain valves 242. When the one or more drain valves 242 are open, the lubricant 201 drains from the one or more planet gears 208 and/or gearbox bearings 216 through the primary lubricant return line 240 and into the one or more tanks 218, as detailed further below. When the one or more drain valves 242 are closed, the one or more drain valves 242 prevent the lubricant 201 from draining from the one or more planet gears 208 and/or gearbox bearings 216 (and, in some examples, from at least one of the other rotating components 219), as detailed further below. The one or more drain valves 242 can include any type of valve that opens to allow the lubricant 201 to flow through the primary lubricant return line 240 and that closes to prevent the lubricant 201 from flowing through the primary lubricant return line 240. In some embodiments, the one or more drain valves 242 are in fluid communication with the primary lubrication system 220 and are controlled to be opened or to be closed based on a pressure signal of the lubricant 201 in the primary lubrication system 220 (e.g., in the primary lubricant supply line 224).

The auxiliary lubrication system 250 includes an auxiliary reservoir 252, an auxiliary lubricant return line 254, and a lubricant dispersion device 256. The auxiliary reservoir 252 stores the lubricant 201 therein, as detailed further below. The auxiliary reservoir 252 can be utilized as a sump in the gearbox assembly 46 or can be located outside of the gearbox assembly 46. In some embodiments, the auxiliary reservoir 252 can be utilized as the one or more tanks 218. The auxiliary reservoir 252 is in fluid communication with the one or more planet gears 208 and/or gearbox bearings 216 (and, in some examples, at least one of the other rotating components 219) such that the lubricant 201 can drain from the one or more planet gears 208 and/or gearbox bearings 216 to the auxiliary reservoir 252. In some embodiments, the primary lubricant return line 240 can be in fluid communication with the auxiliary reservoir 252 such that the lubricant 201 in the auxiliary reservoir 252 flows to the primary lubrication system 220 from the auxiliary reservoir 252 through the primary lubricant return line 240. The auxiliary lubricant return line 254 is in fluid communication with the auxiliary reservoir 252 and the primary lubrication system 220 such that the lubricant 201 can flow from the auxiliary reservoir 252 to the primary lubrication system 220 (e.g., to the primary lubricant supply line 224). In some embodiments, the auxiliary lubricant return line 254 can be in fluid communication with the one or more planet gears 208 and/or gearbox bearings 216 such that the lubricant 201 flows from the auxiliary reservoir 252 to the one or more planet gears 208 and/or gearbox bearings 216 without flowing through the primary lubrication system 220. In such embodiments, the auxiliary lubrication system 250 includes an auxiliary pump that pumps the lubricant 201 from the auxiliary reservoir 252 to the one or more rotating components 219.

The lubricant dispersion device 256 is a mechanical device that collects a portion of the lubricant 201 from the auxiliary reservoir 252 and disperses the portion of the lubricant 201 to the one or more planet gears 208 and/or gearbox bearings 216 (and, in some examples, at least one of the other rotating components 219), as detailed further below. The lubricant dispersion device 256 is a scupper or a flinger that collects the portion of the lubricant 201 from the auxiliary reservoir 252 and flings, or otherwise splashes, the portion of the lubricant 201 onto the one or more planet gears 208 and/or gearbox bearings 216. In this way, the auxiliary lubrication system 250 is referred to as a splash lubrication system.

The lubricant dispersion device 256 is drivingly coupled to the output shaft 47 (e.g., the fan shaft 45 of FIG. 1) such that rotation of the output shaft 47 causes the lubricant dispersion device 256 to rotate. For example, the lubricant dispersion device 256 is drivingly coupled to the output shaft 47 by a lubricant dispersion device gear assembly 260. The lubricant dispersion device gear assembly 260 includes a first lubricant dispersion device gear 262 and a second lubricant dispersion device gear 264. The first lubricant dispersion device gear 262 is coupled to the output shaft 47 and the second lubricant dispersion device gear 264 is coupled to the lubricant dispersion device 256. The second lubricant dispersion device gear 264 intermeshes with the first lubricant dispersion device gear 262 such that rotation of the first lubricant dispersion device gear 262 causes the second lubricant dispersion device gear 264 to rotate. The lubricant dispersion device gear assembly 260 can include any number of gears for changing a rotational speed of the lubricant dispersion device 256 with respect to a rotational speed of the output shaft 47, as desired. In one non-limiting embodiment, the lubricant dispersion device gear assembly 260 includes a gear ratio of greater than 10:1 such that the rotational speed of the lubricant dispersion device 256 is greater than ten times the rotational speed of the output shaft 47.

The lubricant dispersion device 256 also includes a clutch 266 that engages the lubricant dispersion device 256 to cause the lubricant dispersion device 256 to rotate or disengages the lubricant dispersion device 256 to prevent the lubricant dispersion device 256 from rotating, as detailed further below. The clutch 266 can include a centrifugal clutch that engages or disengages the lubricant dispersion device 256 based on the rotational speed of the output shaft 47. For example, the clutch 266 engages the lubricant dispersion device 256 when the rotational speed of the output shaft 47 is less than a rotational speed threshold. The clutch 266 disengages the lubricant dispersion device 256 when the rotational speed of the output shaft 47 is greater than the rotational speed threshold.

In some embodiments, the clutch 266 engages or disengages the lubricant dispersion device 256 based on a pressure of the lubricant in the primary lubrication system 220. For example, clutch 266 engages the lubricant dispersion device 256 when the pressure of the lubricant 201 in the primary lubrication system 220 is less than a primary pressure threshold. The clutch 266 disengages the lubricant dispersion device 256 when the pressure of the lubricant 201 in the primary lubrication system 220 is greater than the primary pressure threshold. In some embodiments, the lubrication system 200 can include a primary pressure signal line that provides fluid communication from the primary lubrication system 220 (e.g., the primary lubricant supply line 224) to the clutch 266 such that the clutch 266 engages or disengages the lubricant dispersion device 256 based on the pressure of the lubricant 201 in the primary lubrication system 220. In some embodiments, the lubrication system 200 includes one or more pressure sensors that sense the pressure of the lubricant 201 in the primary lubrication system 220. The one or more pressure sensors are in communication with the controller 102 (FIG. 1) such that the controller 102 receives the sensed pressure of the lubricant 201 in the primary lubrication system 220 from the one or more sensors and controls the clutch 266 to engage or to disengage the lubricant dispersion device 256 based on the pressure of the lubricant 201 in the primary lubrication system 220.

Figure 3:
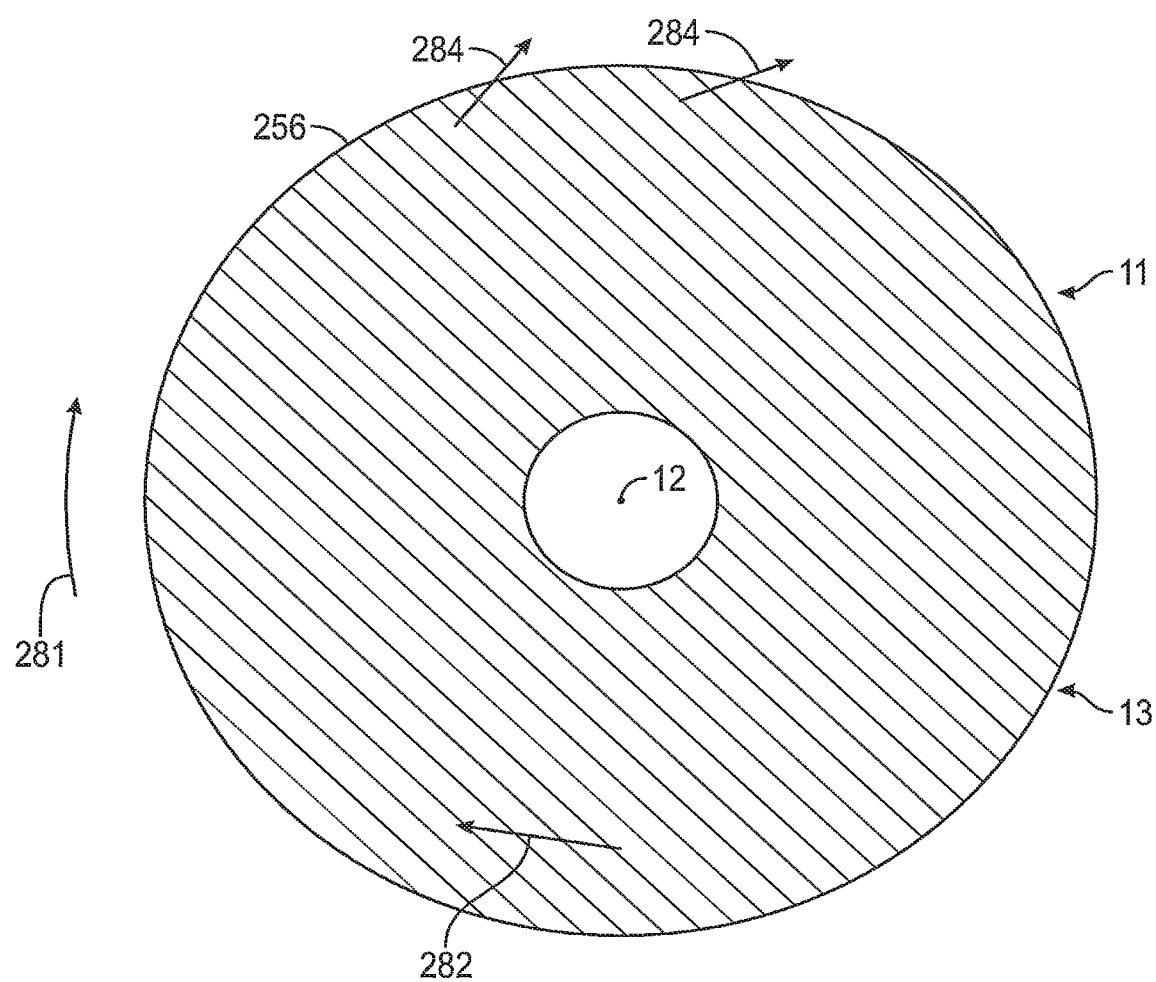
FIG. 3 is a schematic cross-sectional aft view of a lubricant dispersion device of the lubrication system of FIG. 2, taken along plane 2B-2B in FIG. 2, and isolated from the lubrication system, according to the present disclosure.

FIG. 3 is a schematic cross-sectional aft view of the lubricant dispersion device 256, taken at plane 2B-2B in FIG. 2, according to the present disclosure. FIG. 3 shows the lubricant dispersion device 256 isolated from the lubrication system 200, and the lubricant dispersion device gear assembly 260 and the clutch 266 are not shown in FIG. 3 for clarity. As shown in FIG. 3, the lubricant dispersion device 256 is an annular disk that has a generally circular shape. The lubricant dispersion device 256 is annular about the longitudinal centerline axis 12. The lubricant dispersion device 256, however, can have any shape as desired, as long as the lubricant dispersion device 256 contacts the lubricant 201 in the auxiliary reservoir 252 and disperses the lubricant 201 to the one or more rotating components 219.

With reference back to FIG. 2, in operation, the input shaft 37 (the LP shaft 36 of FIG. 1) rotates and causes the sun gear 206 to rotate. The sun gear 206, being intermeshed with the one or more planet gears 208, causes each of the one or more planet gears 208 to rotate about the planet gear longitudinal centerline axis 217. The one or more planet gears 208 rotate with respect to the one or more gearbox bearings 216 within the planet carrier 210. When the gear assembly 204 is the planetary arrangement, the ring gear 212 is stationary, and the one or more planet gears 208, rotate about the longitudinal centerline axis 12.

As the plurality of gears 205 of the gear assembly 204 rotate, the primary lubrication system 220 supplies the lubricant 201 to the one or more planet gears 208 and/or gearbox bearings 216 (and, in some examples, at least one of the other rotating components 219). During operation of the gas turbine engine 10 (FIG. 1), the primary pump 222 pumps the lubricant 201 from the one or more tanks 218 and to the one or more planet gears 208 and/or gearbox bearings 216 through the primary lubricant supply line 224. The primary lubrication system 220 supplies the lubricant 201 to the one or more planet gears 208 and/or gearbox bearings 216 (and, in some examples, at least one of the other rotating components 219).

The lubricant 201 drains from the gear assembly 204 through the primary lubricant return line 240 and to the one or more tanks 218. For example, the one or more drain valves 242 are opened during operation of the gas turbine engine 10, and the primary pump 222 (or the sump pump or a scavenge pump) pumps the lubricant 201 through the primary lubricant return line 240 and re-circulates the lubricant 201 through the primary lubrication system 220 (e.g., through the primary lubricant supply line 224) and to the one or more planet gears 208 and/or gearbox bearings 216. In this way, the lubricant 201 can be re-used to lubricate the one or more planet gears 208 and/or gearbox bearings 216. In some embodiments, the primary lubrication system 220 can also supply the lubricant 201 to other ones of the rotating components 219, other components of the gearbox assembly 46, and/or to other rotating components of the gas turbine engine 10 (FIG. 1). When the primary lubrication system 220 is supplying the lubricant 201 to the one or more planet gears 208 and/or gearbox bearings 216, the clutch 266 is disengaged such that the lubricant dispersion device 256 is prevented from rotating and from dispersing the lubricant 201 to the one or more planet gears 208 and/or gearbox bearings 216.

In some instances, the primary lubrication system 220 may be unable to provide the lubricant 201 to the one or more planet gears 208 and/or gearbox bearings 216. For example, the primary lubrication system 220 may be unable to pressurize the lubricant 201 to supply the lubricant 201 to the one or more planet gears 208 and/or gearbox bearings 216 during windmilling while the gas turbine engine 10 is shut down, or during a failure of the gas turbine engine 10, or the primary lubrication system 220 (e.g., the primary pump 222) fails while in-flight. In such instances, the windmilling may cause the shafts of the gas turbine engine 10 to rotate, thereby causing the gear assembly 204 to rotate. The one or more planet gears 208 and/or gearbox bearings 216 can become damaged if there is not enough lubricant 201 supplied to the one or more planet gears 208 and/or gearbox bearings 216.

Accordingly, during such instances, the auxiliary lubrication system 250 activates to supply the lubricant 201 to the one or more planet gears 208 and/or gearbox bearings 216. For example, the one or more the drain valves 242 close such that the lubricant 201 drains from the one or more planet gears 208 and/or gearbox bearings 216 (as indicated by arrow 280) and fills the auxiliary reservoir 252. The lubricant 201 can drain from the auxiliary reservoir 252 through the auxiliary lubricant return line 254 such that the auxiliary reservoir 252 does not overfill with the lubricant 201. In some embodiments, the auxiliary reservoir 252 fills with the lubricant 201 during operation of the primary lubrication system 220 (e.g., while the primary lubrication system 220 is supplying the lubricant 201 to the one or more planet gears 208 and/or gearbox bearings 216).

The auxiliary reservoir 252 fills with the lubricant 201 such that the lubricant 201 in the auxiliary reservoir 252 contacts a portion (e.g., the bottom portion 13) of the lubricant dispersion device 256. For example, a portion of the lubricant dispersion device 256 extends into the auxiliary reservoir 252 such that the portion of the lubricant dispersion device 256 contacts the lubricant 201 in the auxiliary reservoir 252. When the primary lubrication system 220 is inoperative (e.g., during windmilling, during a shutdown of the gas turbine engine 10, etc.), the clutch 266 engages the lubricant dispersion device 256 such that the rotation of the output shaft 47 causes the lubricant dispersion device 256 to rotate (as indicated by arrow 281 in FIG. 3), as detailed above. As the lubricant dispersion device 256 rotates, the lubricant dispersion device 256 collects a portion of the lubricant 201 in the auxiliary reservoir 252 (as indicated by arrow 282). The rotation of the lubricant dispersion device 256 causes the portion of the lubricant 201 to move from the bottom portion 13 to the top portion 11 of the lubricant dispersion device 256. The rotation of the lubricant dispersion device 256 then causes the portion of the lubricant 201 to separate from the lubricant dispersion device 256 such that the lubricant dispersion device 256 disperses the portion of the lubricant 201 to the one or more planet gears 208 and/or gearbox bearings 216 (e.g., to the top portion 11 of the gear assembly 204 as indicated by arrows 284).

In this way, the lubricant dispersion device 256 collects the portion of the lubricant 201 in the auxiliary reservoir 252 as the lubricant dispersion device 256 rotates through the auxiliary reservoir 252. Thus, the auxiliary lubrication system 250 supplies the lubricant 201 to the one or more planet gears 208 and/or gearbox bearings 216 (and, in some examples, to at least one of the other rotating components 219) even if the primary lubrication system 220 loses pressure and the primary lubrication system 220 is unable to supply the lubricant 201 through the primary lubricant supply line 224. The lubricant dispersion device 256 operates regardless of a rotational direction of the fan 38. For example, the fan 38 can rotate in a first rotational direction (e.g., clockwise) or in a second rotational direction (e.g., counterclockwise) while the fan 38 is windmilling. The lubricant dispersion device 256 collects the lubricant 201 in the auxiliary reservoir 252 and disperses the lubricant 201 to the one or more planet gears 208 and/or gearbox bearings 216 if the fan 38 (FIG. 1) is rotating in the first rotational direction and in the second rotational direction.

In some embodiments, the clutch 266 is controlled by at least one of a pressure of the lubricant 201, a pressure of fuel in the gas turbine engine 10 (FIG. 1), or a pressure of hydraulics of the gas turbine engine 10 (e.g., hydraulics for controlling control surfaces of the aircraft). For example, the clutch 266 disengages the lubricant dispersion device 256 when the at least one of the pressure of the lubricant 201, the pressure of the fuel in the gas turbine engine 10, or the pressure of the hydraulics of the gas turbine engine 10 is greater than a primary pressure threshold. The primary pressure threshold is determined based on a predetermined operating speed of the gas turbine engine 10 (e.g., a speed of the turbo-engine 16 (FIG. 1) or a speed of the fan 38). The clutch 266 engages the lubricant dispersion device 256 when the at least one of the pressure of the lubricant 201, the pressure of the fuel in the gas turbine engine 10, or the pressure of the hydraulics of the gas turbine engine 10 is less than the primary pressure threshold.

In some embodiments, the at least one of the pressure of the lubricant 201, the pressure of the fuel in the gas turbine engine 10, or the pressure of the hydraulics of the gas turbine engine 10 is based on a speed of the turbo-engine 16. For example, when a speed of the turbo-engine 16 (e.g., the HP shaft 34 or the LP shaft 36 of FIG. 1) is greater than a speed threshold, the at least one of the pressure of the lubricant 201, the pressure of the fuel in the gas turbine engine 10, or the pressure of the hydraulics of the gas turbine engine 10 is greater than the primary pressure threshold. Similarly, when the speed of the turbo-engine 16 is less than the speed threshold, the at least one of the pressure of the lubricant 201, the pressure of the fuel in the gas turbine engine 10, or the pressure of the hydraulics of the gas turbine engine 10 is less than the primary pressure threshold. In some embodiments, the speed threshold of the turbo-engine 16 is at least 5% of a maximum speed of the turbo-engine 16. In some embodiments, the speed threshold of the turbo-engine 16 is approximately 5% to approximately 10% of the maximum speed of the turbo-engine 16. The speed threshold can include any value up to the maximum speed of the turbo-engine 16 for determining when to disengage the clutch 266.

In some embodiments, the clutch 266 is controlled by the controller 102 (FIG. 1). For example, the controller 102 controls the clutch 266 to engage or to disengage the lubricant dispersion device 256. In such embodiments, the clutch 266 is an electrically energized clutch. In some embodiments, the clutch 266 disengages the lubricant dispersion device 256 when the controller 102 turns on, and the clutch engages the lubricant dispersion device 256 when the controller 102 turns off (e.g., during a shutdown of the gas turbine engine 10). The controller 102 turns on when the speed of the turbo-engine 16 greater than the speed threshold. The gas turbine engine 10 provides power to the controller 102 to turn the controller 102 on when the speed of the turbo-engine 16 is greater than the speed threshold. The controller 102 turns off when the speed of the turbo-engine 16 is less than the speed threshold.

Figure 4:
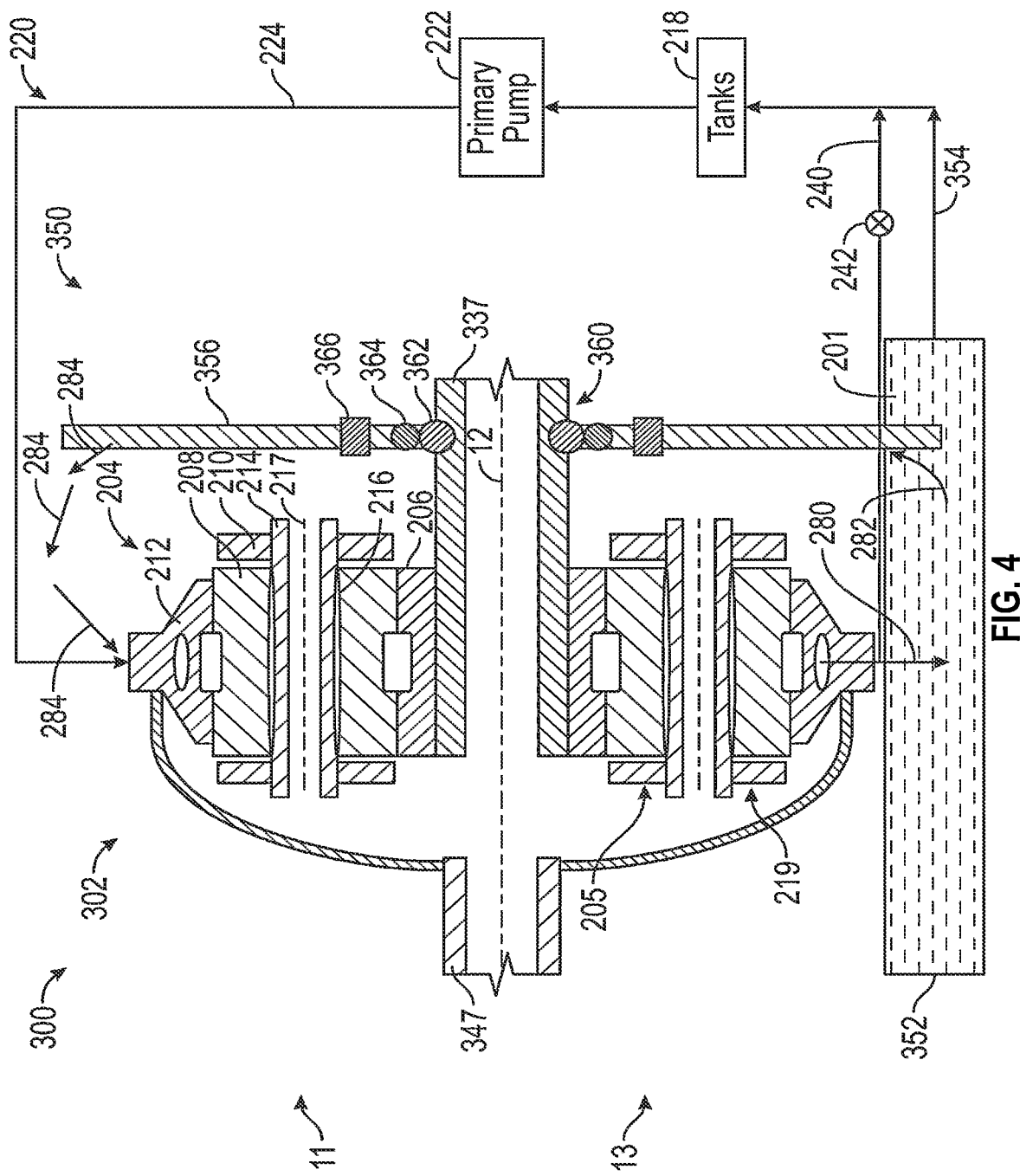
FIG. 4 is a schematic axial end cross-sectional view of a lubrication system for a gearbox assembly, taken along a latitudinal centerline axis of the gearbox assembly, according to another embodiment.

FIG. 4 is a schematic axial end cross-sectional view of a lubrication system 300 for a gearbox assembly 302 for a gas turbine engine, taken at a longitudinal centerline axis of the gearbox assembly 302, according to the present disclosure. The lubrication system 300 and the gearbox assembly 302 are substantially similar to the lubrication system 200 and the gearbox assembly 46 of FIG. 2, respectively. The gearbox assembly 302 includes an input shaft 337 and an output shaft 347. The lubrication system 300 includes the primary lubrication system 220 and an auxiliary lubrication system 350. The auxiliary lubrication system 350 includes an auxiliary reservoir 352, an auxiliary lubricant return line 354, and a lubricant dispersion device 356.

The lubricant dispersion device 356 is substantially similar to the lubricant dispersion device 256 of FIGS. 2 and 3, but the lubricant dispersion device 356 is drivingly coupled to the input shaft 337. For example, the lubricant dispersion device 356 includes a lubricant dispersion device gear assembly 360 including a first lubricant dispersion device gear 362 and a second lubricant dispersion device gear 364. The first lubricant dispersion device gear 362 is coupled to the input shaft 337 and the second lubricant dispersion device gear 364 is coupled to the lubricant dispersion device 356, and intermeshes with the first lubricant dispersion device gear 362. In one non-limiting embodiment, the lubricant dispersion device gear assembly 360 includes a gear ratio of greater than 10:1 such that the rotational speed of the lubricant dispersion device 356 is greater than ten times the rotational speed of the input shaft 337. The lubricant dispersion device 356 also includes a clutch 366. The lubrication system 300 and the gearbox assembly 302 operate substantially similar as to the lubrication system 200 and the gearbox assembly 46 of FIG. 2, respectively. The clutch 366 engages or disengages the lubricant dispersion device 356 similar to the clutch 266 of FIG. 2. In this way, rotation of the input shaft 337 causes the lubricant dispersion device 356 to rotate when the clutch 366 engages the lubricant dispersion device 356. The lubricant dispersion device 356 is prevented from rotating when the clutch 366 is disengaged.

In some examples, a gas turbine engine can include a lubrication system and a gearbox assembly substantially similar to the lubrication system 200 and the gearbox assembly 46 of FIG. 2, respectively. The gearbox assembly includes an input shaft and an output shaft. The gearbox assembly includes a gear assembly having a plurality of gears including a sun gear, the one or more planet gears 208 (FIG. 2), and the ring gear 212 (FIG. 2). The sun gear is different than the sun gear 206 of FIG. 2, as detailed further below. The lubrication system includes the primary lubrication system 220 (FIG. 2) and an auxiliary lubrication system. The auxiliary lubrication system includes an auxiliary reservoir, an auxiliary lubricant return line, and a lubricant dispersion device.

The lubricant dispersion device is substantially similar to the lubricant dispersion device 256 of FIGS. 2 and 3, but the lubricant dispersion device is drivingly coupled to the sun gear. For example, the lubricant dispersion device includes a lubricant dispersion device gear assembly including a first lubricant dispersion device gear and a second lubricant dispersion device gear. The first lubricant dispersion device gear is coupled to the sun gear and the second lubricant dispersion device gear is coupled to the lubricant dispersion device and intermeshes with the first lubricant dispersion device gear. In one non-limiting embodiment, the lubricant dispersion device gear assembly includes a gear ratio of greater than 10:1 such that the rotational speed of the lubricant dispersion device is greater than ten times the rotational speed of the gear assembly. The lubricant dispersion device also includes a clutch. The lubrication system and the gearbox assembly operate substantially similar as to the lubrication system 200 and the gearbox assembly 46 of FIG. 2, respectively. The clutch engages or disengages the lubricant dispersion device similar to the clutch 266 of FIG. 2. In this way, rotation of the sun gear causes the lubricant dispersion device to rotate when the clutch engages the lubricant dispersion device. The lubricant dispersion device is prevented from rotating when the clutch is disengaged. While the lubricant dispersion device is drivingly coupled to the sun gear, the lubricant dispersion device can be coupled to any of the components of the gear assembly, such as, for example, any of the plurality of gears, a planet carrier 210, or a pin.

Figure 5A:
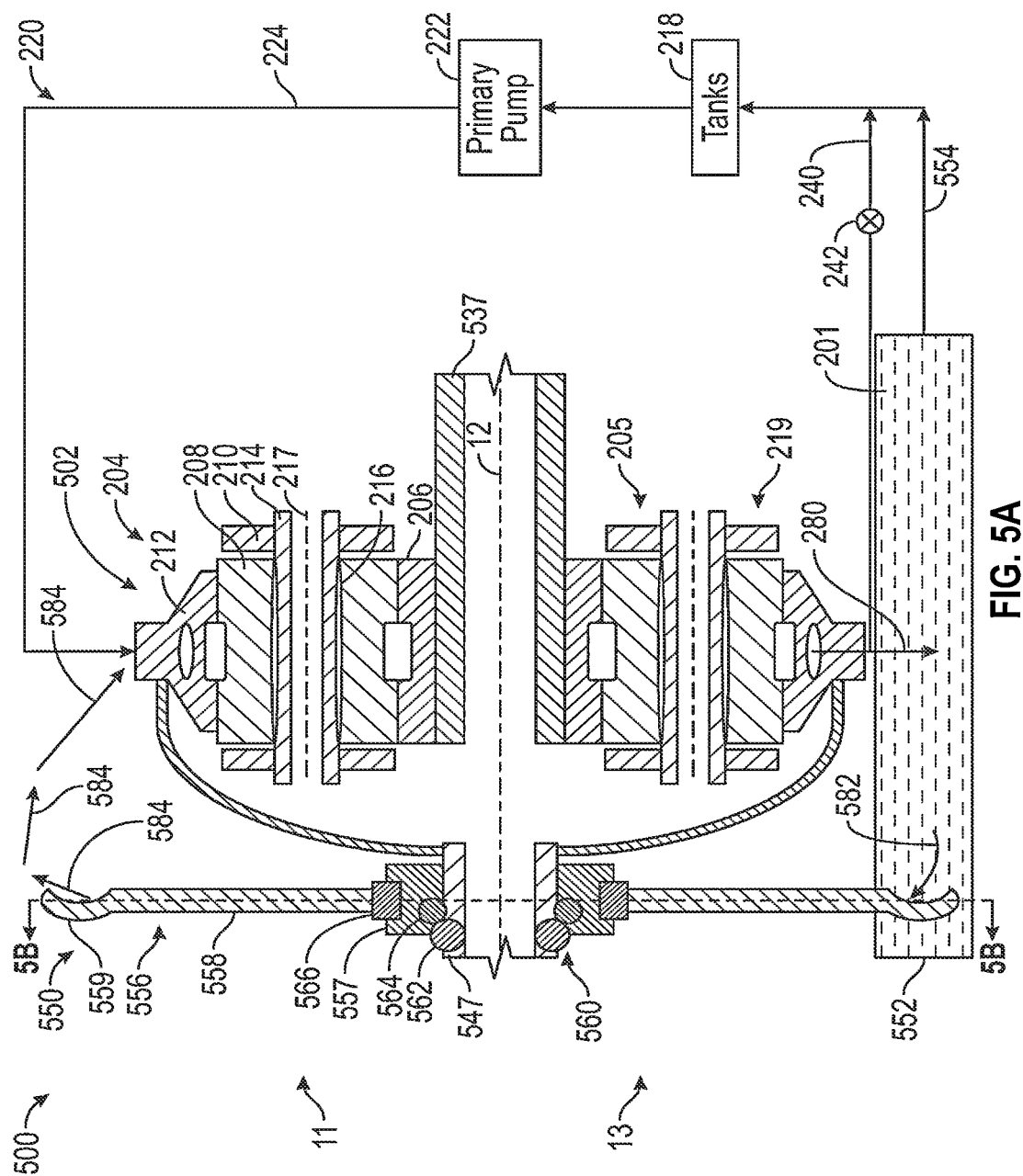
FIG. 5A is a schematic axial end cross-sectional view of a lubrication system for a gearbox assembly for a gas turbine engine, taken along a latitudinal centerline axis of the gearbox assembly, according to another embodiment.
Figure 5B:
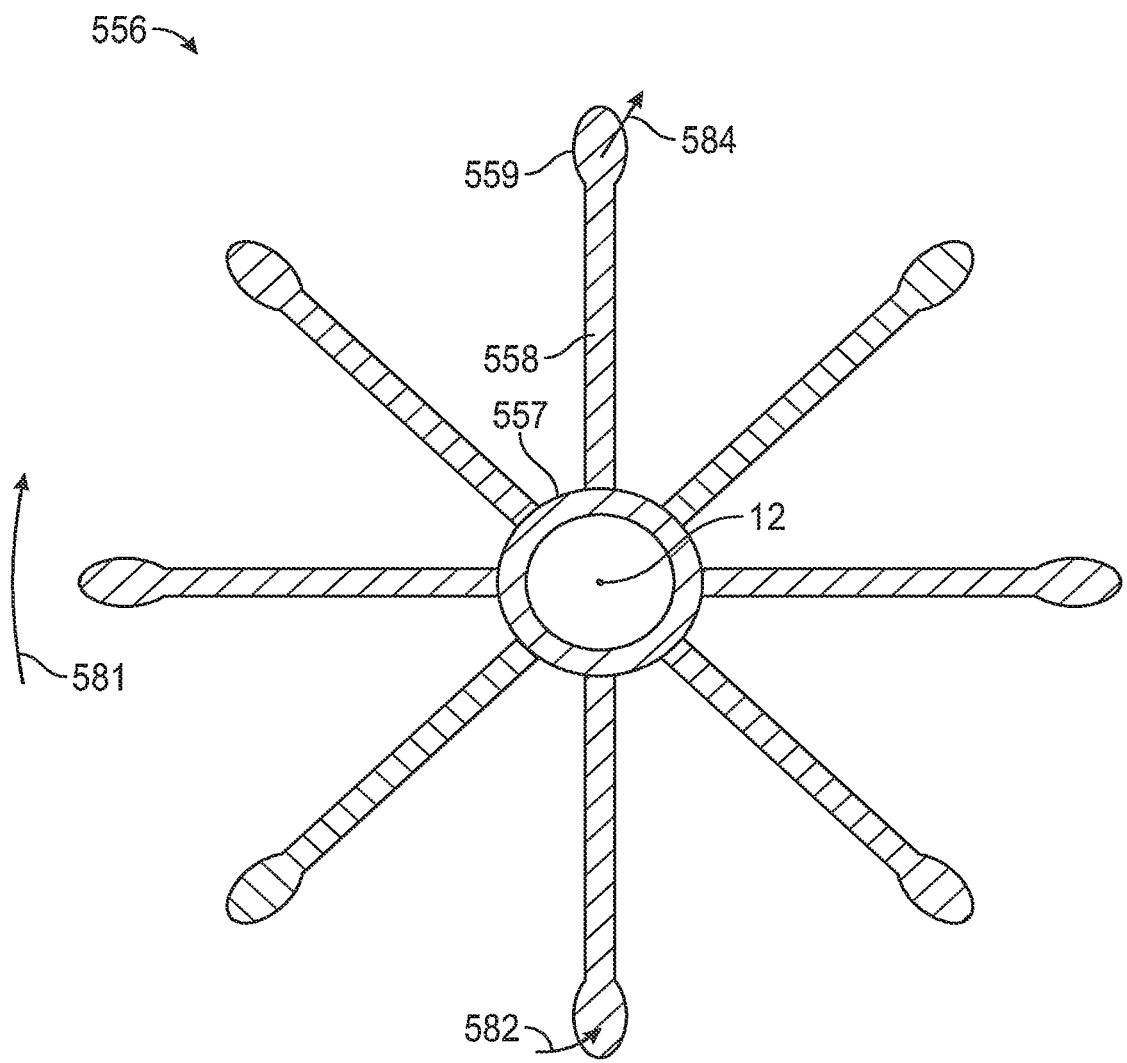
FIG. 5B is a schematic cross-sectional aft view of a lubricant dispersion device of the lubrication system of FIG. 5A, taken along plane 5B-5B in FIG. 5A, and isolated from the lubrication system, according to the present disclosure.

FIG. 5A is a schematic axial end cross-sectional view of a lubrication system 500 for a gearbox assembly 502 for a gas turbine engine, taken at a longitudinal centerline axis of the gearbox assembly 502, according to another embodiment. FIG. 5B is a schematic cross-sectional aft view of the lubricant dispersion device 556 of the lubrication system 500, taken at plane 5B-5B in FIG. 5A, and isolated from the lubrication system 500, according to the present disclosure. The lubrication system 500 and the gearbox assembly 502 are substantially similar to the lubrication system 200 and the gearbox assembly 46 of FIG. 2, respectively. The gearbox assembly 502 includes an input shaft 537 and an output shaft 547. The lubrication system 500 includes the primary lubrication system 220 and an auxiliary lubrication system 550. The auxiliary lubrication system 550 includes an auxiliary reservoir 552, an auxiliary lubricant return line 554, and the lubricant dispersion device 556. The lubricant dispersion device 556 is different from the lubricant dispersion device 256 of FIG. 2.

The lubricant dispersion device 556 includes a hub 557 and a plurality of arms 558 that extend from the hub 557. The plurality of arms 558 are spaced circumferentially about the hub 557 as shown in FIG. 5B. FIG. 5A shows two of the plurality of arms 558 and FIG. 5B shows eight of the plurality of arms 558. The lubricant dispersion device 556 can include any number of arms 558. Each of the plurality of arms 558 includes a scoop portion 559 that is shaped to scoop the lubricant 201 in the auxiliary reservoir 552, as detailed further below. For example, the scoop portion 559 has a generally crescent shape such that the scoop portion 559 is curved to scoop the lubricant 201 into the scoop portion 559 and to disperse the lubricant 201 to the one or more rotating components 219. In this way, the scoop portion 559 is shaped substantially like a spoon.

The lubricant dispersion device 556 includes a lubricant dispersion device gear assembly 560 including a first lubricant dispersion device gear 562 and a second lubricant dispersion device gear 564. The first lubricant dispersion device gear 562 is coupled to the output shaft 547 and the second lubricant dispersion device gear 564 is coupled to the lubricant dispersion device 556, and intermeshes with the first lubricant dispersion device gear 562. The lubricant dispersion device 556 also includes a clutch 566. The lubricant dispersion device gear assembly 560 and the clutch 566 are removed from the view of FIG. 5B for clarity. While the lubricant dispersion device 556 is coupled to the output shaft 547 in FIG. 5A, the lubricant dispersion device 556 can be coupled to the input shaft 537 or to the gear assembly 204, similar to the embodiments of FIGS. 3 and 4, respectively. In this way, the lubricant dispersion device 556 is coupled to at least one of the output shaft 547, the input shaft 537, or the gear assembly 204. In one non-limiting embodiment, the lubricant dispersion device gear assembly 560 includes a gear ratio of greater than 10:1 such that the rotational speed of the lubricant dispersion device 556 is greater than ten times the rotational speed of the at least one of the output shaft 547, the input shaft 537, or the gear assembly 204.

The lubrication system 500 and the gearbox assembly 502 operate substantially similar as to the lubrication system 200 and the gearbox assembly 46 of FIG. 2, respectively. The clutch 566 engages or disengages the lubricant dispersion device 556 similar to the clutch 266 of FIG. 2. In this way, rotation of the sun gear 206 causes the lubricant dispersion device 556 to rotate when the clutch 566 engages the lubricant dispersion device 556. The lubricant dispersion device 556 is prevented from rotating when the clutch 566 is disengaged. While the lubricant dispersion device 556 is drivingly coupled to the output shaft 547, the lubricant dispersion device 556 can be coupled to the input shaft 537 (e.g., similar as to FIG. 4), or to any of the components of the gear assembly 204, such as, for example, any of the plurality of gears 205, the planet carrier 210, or the pin 214.

The auxiliary reservoir 552 fills with the lubricant 201 such that the lubricant 201 in the auxiliary reservoir 552 contacts a portion (e.g., the bottom portion 13) of the lubricant dispersion device 556. For example, each of the plurality of arms 558 has a length such that the scoop portion 559 of each of the plurality of arms 558 extends into the auxiliary reservoir 552 and contacts a portion of the lubricant 201 in the auxiliary reservoir 552 when each of the plurality of arms 558 rotates to the bottom portion 13. When the primary lubrication system 220 is inoperative (e.g., during windmilling, during a shutdown of the gas turbine engine 10, etc.), the clutch 566 engages the lubricant dispersion device 556 such that the rotation of the output shaft 47 causes the lubricant dispersion device 556 to rotate (as indicated by arrow 581 in FIG. 5B), as detailed above. As the lubricant dispersion device 556 rotates, the scoop portion 559 of each of the plurality of arms 558 collects a portion of the lubricant 201 in the auxiliary reservoir 552 (as indicated by arrow 582). The rotation of the lubricant dispersion device 556 causes each of the plurality of arms 558 to rotate from the bottom portion 13 to the top portion 11 such that the scoop portion 559 carries the portion of the lubricant 201 to the top portion 11. At the top portion 11, the rotation of the lubricant dispersion device 556 then causes the portion of the lubricant 201 to separate from the scoop portion 559 such that the lubricant dispersion device 556 disperses the portion of the lubricant 201 to the one or more rotating components 219 (e.g., to the top portion 11 of the gear assembly 204) (as indicated by arrows 584). For example, the scoop portion 559 is shaped (e.g., includes a curve) that directs the portion of the lubricant 201 towards the one or more planet gears 208 and/or gearbox bearings 216 (and, in some examples, towards at least one of the other rotating components 219) when each of the plurality of arms 558 rotates to the top portion 11.

In this way, the lubricant dispersion device 556 collects the portion of the lubricant 201 in the auxiliary reservoir 552 as the scoop portion 559 of each of the plurality of arms 558 rotates through the auxiliary reservoir 552. In this way, the auxiliary lubrication system 550 supplies the lubricant 201 to the one or more gearbox bearings 216 (and, in some examples, towards at least one of the other rotating components 219) even if the primary lubrication system 220 loses pressure and the primary lubrication system 220 is unable to supply the lubricant 201 through the primary lubricant supply line 224.

Figure 6:
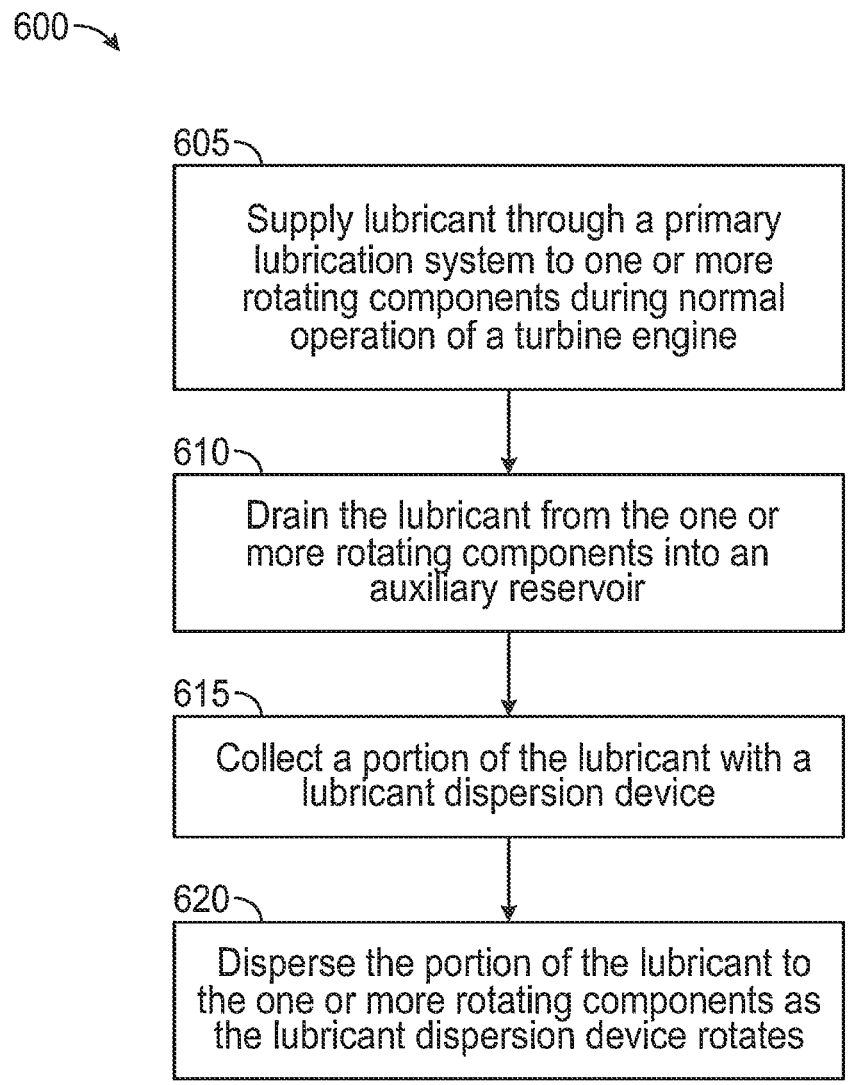
FIG. 6 is a flow diagram of a method of operating a lubrication system, according to the present disclosure.

FIG. 6 is a flow diagram of a method 600 of operating the lubrication system 200, 300, 500. The lubrication system 200, 300, 500 can be any of the lubrication systems detailed herein. In step 605, the method 600 includes supplying the lubricant 201 through the primary lubrication system 220 to the one or more planet gears 208 and/or gearbox bearings 216 (and, in some examples, to at least one of the other rotating components 219) during normal operation of the gas turbine engine 10. For example, the method 600 includes pumping, with the primary pump 222, the lubricant 201 to the one or more planet gears 208 and/or gearbox bearings 216 through the primary lubricant supply line 224.

In step 610, the method 600 includes draining the lubricant 201 from the one or more planet gears 208 and/or gearbox bearings 216 (and, in some examples, from at least one of the other rotating components 219) into the auxiliary reservoir 252, 352, 552. For example, the method 600 includes draining the lubricant 201 through the auxiliary lubricant return line 254, 354, 554. In some embodiments, the method 600 includes draining the lubricant 201 from the one or more planet gears 208 and/or gearbox bearings 216 to the one or more tanks 218 through the primary lubricant return line 240 during normal operation of the gas turbine engine 10. The method 600 can include opening the one or more drain valves 242 to drain the lubricant 201 from the one or more planet gears 208 and/or gearbox bearings 216 through the primary lubricant return line 240. The method 600 can include closing the one or more drain valves 242 to cause the lubricant 201 to drain into the auxiliary reservoir 252, 352, 552.

In step 615, the method 600 includes collecting a portion of the lubricant 201 in the auxiliary reservoir 252, 352, 552 with the lubricant dispersion device 256, 356, 556. In step 620, the method 600 includes dispersing the portion of the lubricant 201 to the one or more planet gears 208 and/or gearbox bearings 216 (and, in some examples, to at least one of the other rotating components 219) as the lubricant dispersion device rotates. In some embodiments, the method 600 includes scooping the lubricant 201 in the auxiliary reservoir 252, 352, 552 with the scoop portion 559 of the lubricant dispersion device 556. The method 600 includes dispersing the lubricant 201 to the one or more planet gears 208 and/or gearbox bearings 216 with the scoop portion 559.

In some embodiments, the lubricant dispersion device 256, 356, 556 is coupled to at least one of the output shaft 47, 347, 547 or the input shaft 37, 337, 537, and the method 600 includes causing the lubricant dispersion device 256, 356, 556 to rotate with rotation of the at least one of the output shaft 47, 347, 547 or the input shaft 37, 337, 537. In some embodiments, the lubricant dispersion device 256, 356, 556 is drivingly coupled to the gear assembly 204, and the method 600 further includes causing the lubricant dispersion device 256, 356, 556 to rotate with rotation of the gear assembly 204. In some embodiments, the method 600 includes rotating the lubricant dispersion device 256, 356, 556 in a first rotational direction of the fan 38. The method 600 can include rotating the lubricant dispersion device 256, 356, 556 in a second rotational direction of the fan 38. The second rotational direction is opposite the first rotational direction.

In some embodiments, the method 600 includes rotating the lubricant dispersion devices 256, 356, 556 when the primary lubrication system 220 is unable to supply the lubricant 201 to the one or more planet gears 208 and/or gearbox bearings 216 (and, in some examples, to at least one of the other rotating components 219). The method 600 includes preventing the lubricant dispersion devices 256, 356, 556 from rotating when the primary lubrication system 220 is supplying the lubricant 201 to the one or more rotating components 219.

In some embodiments, the method 600 can include rotating the lubricant dispersion device 256, 356, 556 based on at least one of the pressure of the lubricant in the primary lubrication system 220, a pressure of fuel in the gas turbine engine 10, or a pressure of hydraulics in the gas turbine engine 10. The method 600 includes rotating the lubricant dispersion device 256, 356, 556 when the at least one of the pressure of the lubricant in the primary lubrication system 220, the pressure of the fuel in the gas turbine engine 10, or the pressure of the hydraulics in the gas turbine engine 10 is less than a primary pressure threshold. The method 600 further includes preventing the lubricant dispersion device 256, 356, 556 from rotating when the at least one of the pressure of the lubricant in the primary lubrication system 220, the pressure of the fuel in the gas turbine engine 10, or the pressure of the hydraulics in the gas turbine engine 10 is greater than the primary pressure threshold.

In some embodiments, the method 600 can include rotating the lubricant dispersion device 256, 356, 556 based on a speed of the turbo-engine 16. The method 600 can include rotating the lubricant dispersion device 256, 356, 556 when the speed of the turbo-engine 16 is less than a speed threshold. The method can include preventing the lubricant dispersion device 256, 356, 556 from rotating when the speed of the turbo-engine 16 is greater than the speed threshold.

In some embodiments, the method 600 can include rotating the lubricant dispersion device 256, 356, 556 when the controller 102 turns off. The method 600 can include preventing the lubricant dispersion device 256, 356, 556 from rotating when the controller 102 turns on.

In some embodiments, the method 600 includes engaging, with the clutch 266, 366, 566, the lubricant dispersion device 256, 356, 556 such that the lubricant dispersion device 256, 356, 556 rotates. The method 600 can include disengaging, with the clutch 266, 366, 566, the lubricant dispersion device 256, 356, 556 to prevent the lubricant dispersion device 256, 356, 556 from rotating. The method 600 can include engaging the lubricant dispersion device 256, 356, 556 with the clutch 266, 366, 566 when the primary lubrication system 220 is unable to supply the lubricant 201 to the one or more planet gears 208 and/or gearbox bearings 216. The method 600 can include disengaging the lubricant dispersion device 256, 356, 556 with the clutch 266, 366, 566 when the primary lubrication system 220 is supplying the lubricant 201 to the one or more planet gears 208 and/or gearbox bearings 216 (and, in some examples, to at least one of the other rotating components 219).

In some embodiments, the method 600 includes engaging or disengaging the lubricant dispersion device 256, 356, 556 with the clutch 266, 366, 566 based on the rotational speed of the least one of the output shaft 47, 347, 547, the input shaft 37, 337, 537, or the gear assembly 204. The method 600 can include engaging the lubricant dispersion device 256, 356, 556 with the clutch 266, 366, 566 when the rotational speed of the at least one of the output shaft 47, 347, 547, the input shaft 37, 337, 537, or the gear assembly 204 is less than a rotational speed threshold. The method 600 can include disengaging the lubricant dispersion device 256, 356, 556 with the clutch 266, 366, 566 when the rotational speed of the at least one of the output shaft 47, 347, 547, the input shaft 37, 337, 537, or the gear assembly 204, 404 is greater than the rotational speed threshold.

In some embodiments, the method 600 includes engaging or disengaging the lubricant dispersion device 256, 356, 556 with the clutch 266, 366, 566 based on a pressure of the lubricant 201 in the primary lubrication system 220. The method 600 can include engaging the lubricant dispersion device 256, 356, 556 with the clutch 266, 366, 566 when the pressure of the lubricant 201 in the primary lubrication system 220 is less than a primary pressure threshold. The method 600 can include disengaging the lubricant dispersion device 256, 356, 556 with the clutch 266, 366, 566 when the pressure of the lubricant 201 in the primary lubrication system 220 is greater than the primary pressure threshold.

In some embodiments, the method 600 includes engaging or disengaging the lubricant dispersion device 256, 356, 556 with the clutch 266, 366, 566 based on at least one of the pressure of the lubricant 201 in the primary lubrication system 220, a pressure of fuel in the gas turbine engine 10, or a pressure of hydraulics in the gas turbine engine 10. The method 600 can include engaging the lubricant dispersion device 256, 356, 556 with the clutch 266, 366, 566 when the at least one of the pressure of the lubricant 201 in the primary lubrication system 220, the pressure of the fuel in the gas turbine engine 10, or the pressure of the hydraulics in the gas turbine engine 10 is less than a primary pressure threshold. The method 600 can include disengaging the lubricant dispersion device 256, 356, 556 with the clutch 266, 366, 566 when the at least one of the pressure of the lubricant 201 in the primary lubrication system 220, the pressure of the fuel in the gas turbine engine 10, or the pressure of the hydraulics in the gas turbine engine 10 is greater than the primary pressure threshold.

In some embodiments, the method 600 includes engaging the lubricant dispersion device 256, 356, 556 with the clutch 266, 366, 566 when the controller 102 turns off. The method 600 can include disengaging the lubricant dispersion device 256, 356, 556 with the clutch 266, 366, 566 when the controller 102 turns on.

Accordingly, the present disclosure provides for supplying the lubricant to the one or more planet gears and/or gearbox bearings (and, in some examples, one or more of the other rotating components) during a shutdown of the gas turbine engine or other loss of pressure scenarios (e.g., while the gas turbine engine is operating). The lubrication system herein supplies the lubricant during windmilling and loss of pressure scenarios regardless of a rotational direction of the fan. For example, the auxiliary lubrication system supplies the lubricant to the one or more planet gears and/or gearbox bearings whether the fan is rotating in a first rotational direction or in a second rotational direction that is opposite the first rotational direction. In some embodiments, the auxiliary lubrication system operates passively, for example, based on the pressure of the lubricant from the lubricant pressure signal line, and operates independently of the controller. In this way, the auxiliary lubrication system can operate even if there is a controller failure.

The lubricant dispersion devices of the present disclosure disperse the lubricant in the auxiliary reservoir to the one or more planet gears and/or gearbox bearings (and, in some examples, one or more of the other rotating components) when the primary lubrication system is unable to supply the lubricant to the one or more rotating components. The lubricant dispersion devices, being drivingly coupled to the output shaft, the input shaft, or the components of the gear assembly, ensures that the lubricant dispersion devices rotate while the output shaft, the input shaft, or the components of the gear assembly rotate. In this way, the lubricant dispersion devices disperse the lubricant the to the one or more planet gears and/or gearbox bearings even if the fan is windmilling while the gas turbine engine is operating or while the gas turbine engine is shut down. Further, the lubricant dispersion devices reduce complexity and weight of the lubrication system by supplying the lubricant to the one or more planet gears and/or gearbox bearings without the use of a pump.

Figure 7:
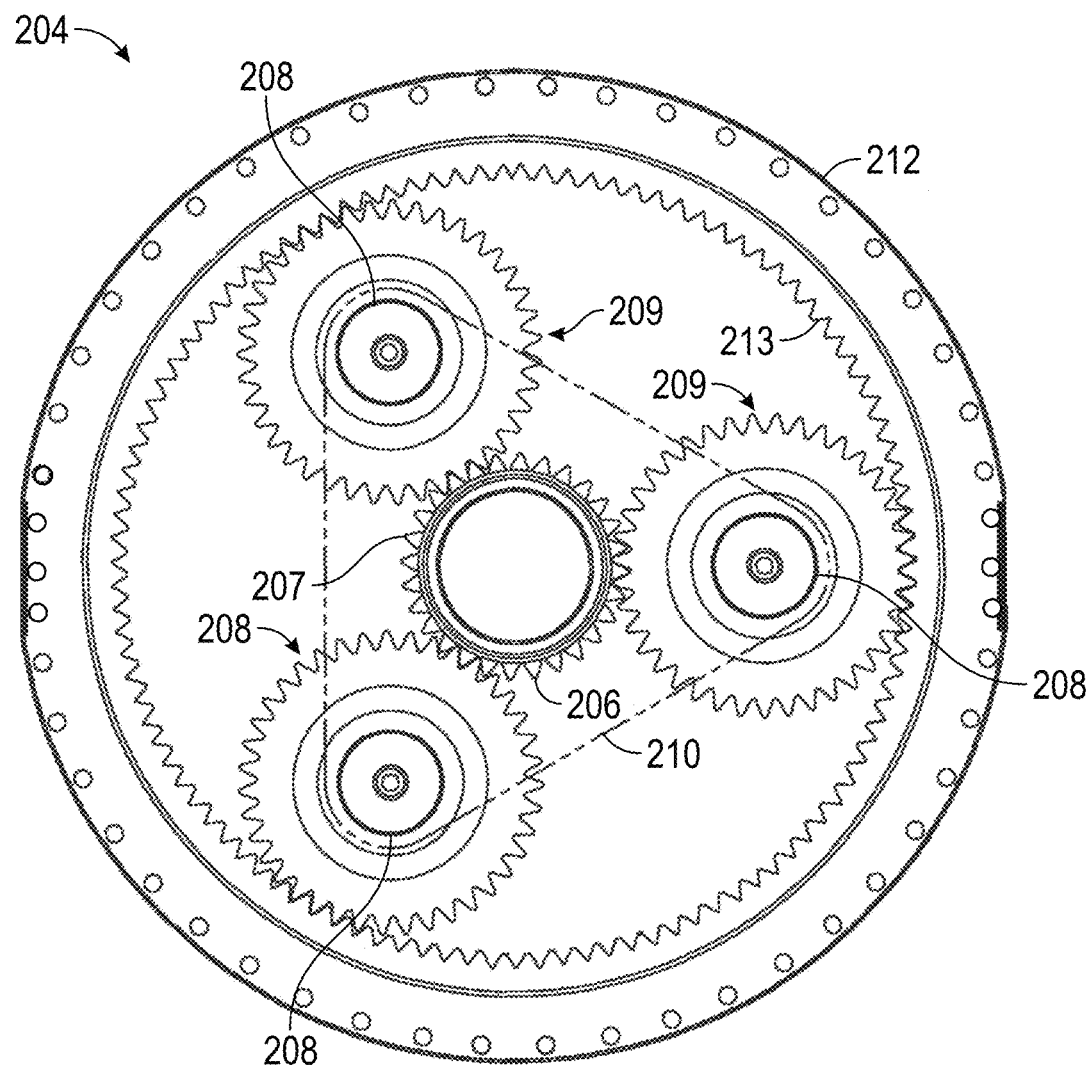
FIG. 7 shows a schematic diagram of a gear assembly of the gas turbine engine shown in FIG. 1, according to one example.

FIG. 7 is a schematic diagram of the gear assembly 204 of the gearbox assembly 46. As shown, the gear assembly 204 includes the sun gear 206, the plurality of planet gears 208, the carrier 210, and the ring gear 212 arranged in a planetary configuration. Although the gear assembly 204 is depicted in FIG. 7 as including three planet gears 204, the gear assembly 204 can include any number of planet gears 208 that enable the operation of the gear assembly 204 as described herein. The number of planet gears 208 is in a range from three planet gears 208 to six planet gears 208. Thus, in some examples, the number of planet gears 208 can be three, four, five, or six planet gears 208.

As shown, the sun gear 206 engages the plurality of planet gears 208 through a plurality of complementary sun gear teeth 207 and a plurality of planet gear teeth 209 circumferentially spaced about a radially outer periphery of the sun gear 206 and a radially outer periphery of each of the plurality of planet gears 208, respectively. The plurality of planet gears 208 engage the ring gear 212 through a plurality of ring gear teeth 213 complementary to the planet gear teeth 209. The ring gear teeth 213 are circumferentially spaced about a radial inner periphery of the ring gear 212 and planet gear teeth 209 are circumferentially spaced about a radial outer periphery of each of the plurality of planet gears 208.

A sum of the number of ring gear teeth 213 and sun gear teeth 207 divided by the number of sun gear teeth 207 is defined herein as the gear ratio (GR) of the gear assembly 204. The gear ratio, which is dimensionless, is a value that can be from 2.5 to 5, 3.2 to 4.0, or 3.5 to 4.0.

Figure 8:
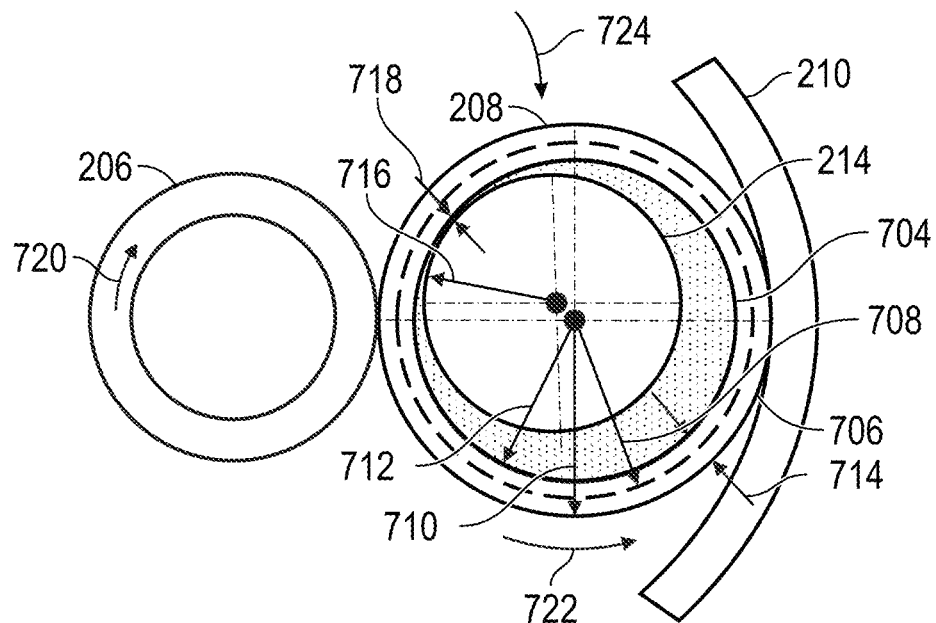
FIG. 8 shows a partial schematic diagram of the gear assembly shown in FIG. 7, according to one example.

FIG. 8 is a partial and schematic diagram of the gear assembly 204 in the planetary configuration showing a ring gear rim of the ring gear 212, a planet gear rim 706 of one of the plurality of planet gears 208, the pin 214 coupled to the planet gear 208, and a sun gear rim of the sun gear 206. Each of the sun gear 206, planet gear 208, and ring gear 212 are schematically represented by a "rim" having an inner radius and outer radius as measured from the center of the planet gear.

The pin 214 can include the gearbox bearing 216, which can desirably be a hydrodynamic journal bearing without any rolling elements. In some examples, journal bearings can be desirable over bearings having rolling elements (e.g., roller bearings) because journal bearings can be simpler, more durable, and cheaper than roller bearings. The planet gear 208 can include a lubricant 704 disposed between the pin 214 and the planet gear 208 to provide lubrication between the outer surface of the pin 214 (i.e., a pin outer surface located at a radial distance 716 from the center of the pin 214) and an inner surface of the planet gear 208 (located at a radial distance 712 from the center of the planet gear 208). The lubricant 704 can be supplied by a lubrication system (e.g., the lubrication system 200 comprising the primary lubrication system 220 and the auxiliary lubrication system 250).

The planet gear rim 706 is defined as the portion of the planet gear 208 from the inner surface of the planet gear 208 to the portion of the planet gear 208 located a radial distance 710 from the center of the planet gear 208 corresponding to a gear root radius (i.e., the radial location of the roots of the planet gear teeth 209). The planet gear rim 706 has a thickness 714 and a neutral axis of bending (as indicated by the dashed line) located at radial distance 708 from the center of the planet gear 208. The radial distance 708, hereinafter referred to as the bending stress neutral axis radius ($r_p$), is the radial location where normal stresses in the planet gear rim 706 associated with bending of the planet gear 208 in the plane of FIG. 8, e.g., pinching of the planet gear 208 between the sun gear 206 and ring gear 212, are equal to zero. The planet gear bending stress neutral axis radius ($r_p$) 708, measured in inches, is determined to be a value in a range from 1.5 inches to 4.0 inches according to the disclosure.

The carrier 210 is coupled to the pin 214, such that rotation of the sun gear 206, which in turn causes the planet gears 208 to rotate, induces rotation in the carrier 210, which is coupled to the fan shaft 45. Thus, torque from the LP shaft 36 is transferred via the sun gear 206, the planet gear 208, and the carrier 210 to the fan shaft 45 coupled to the plurality of fan blades 40. This torque transfer induces significant loads on the gear assembly 204, both in terms of the loads generated by the torque transfer and the associated off-axis loads, as explained in greater detail below. Given this significant loading on such a power gear box, the design of the power gear box elements to ensure that metal to metal contact is avoided during high load conditions (i.e., takeoff) without imposing unacceptable burdens on the architecture in terms of weight, size, and thermal management systems is needed to support proper functioning. Furthermore, since the loads include unevenly distributed loads on the gearbox bearings 216 within the planet gears 208, there exists a need to manage the loads on the gearbox assembly 46 to ensure safe and reliable operation of the gearbox assembly 46.

Referring again to FIG. 8, the resultant loading of the gear assembly 204 when a torque is transferred from the LP shaft 36 through the power gear box 46 and output to the fan shaft 45 urges the planet gear 208 (represented in FIG. 8 as the rim 706) towards the outer surface of the pin 702. The lubricant 704 is disposed between the inner surface of the planet gear 208 and the outer surface of the pin 702 to avoid metal-to-metal contact between the parts and to permit the planet gear 208 to freely rotate about the pin 702. The pin 702 includes a pin radius 716. A clearance ($c_r$) 718 is the minimum radial distance between the pin 702 and the planet gear rim 706 when the gearbox assembly 46 is under a loaded condition (i.e., when a torque is being transferred from the LP shaft 36 to the fan shaft 45). The inventors determined that in order to reliably maintain operating conditions through a suitable number of cycles, taking into account the different aircraft mission requirements, the clearance ($c_r$) should be within a range of 0.00075 inches to 0.012 inches. If the clearance ($c_r$) were less than 0.00075 inches, then it is more likely that at least some metal-to-metal contact would result (resulting in higher friction, significant heat generation and possibly leading to gearbox failure). On the other hand, a clearance that is excessively high (above 0.012 inches) can also reduce bearing performance. The inventors found that with a clearance above 0.012 inches the desired oil pressure between the pin and gear cannot be reliably maintained. The bearing stiffness is reduced if the clearance is too high.

The planet gear 208 can include at least one material selected from a plurality of alloys including, but not limited to, ANSI M50 (AMS6490, AMS6491, and ASTM A600), M50 Nil (AMS6278), Pyrowear 675 (AMS5930), Pyrowear 53 (AMS6308), Pyrowear 675 (AMS5930), ANSI9310 (AMS6265), 32CDV13 (AMS6481), ceramic (silicon nitride), Ferrium C61 (AMS6517), and Ferrium C64 (AMS6509). Additionally, in some examples, the metal materials can be nitride to improve the life and resistance to particle damage. The planet gear 208 can include any combination of alloys and any percent weight range of those alloys that facilitates operation of the planet gear 208 as described herein, including but not limited to combinations of M50 Nil (AMS6278), Pyrowear 675 (AMS5930), and Ferrium C61 (AMS6517). The planet gear 208 can have a Young's modulus of elasticity which is dependent on the material used to construct the planet gear 208. The Young's modulus of elasticity can be defined as the ratio of the stress (force per unit area) along an axis to the strain (ratio of deformation over initial length) along that axis in the range of stress in which Hooke's law holds.

During operation, when the gear assembly 204 is in a planetary configuration, the LP shaft 36 (FIG. 1) rotates, applying a torque to the sun gear 206 in a clockwise direction as indicated by a first arrow 720. The sun gear 206, in turn, rotates, causing the planet gears 208 to rotate in a counter-clockwise direction as indicated by a second arrow 722. The planet gear 204, in turn, causes the carrier 210 to rotate in a clockwise direction as indicated by a third arrow 724. However, it should be understood that, in other examples, the sun gear 206 can alternatively rotate in the counter-clockwise direction, the planet gears 208 can alternatively rotate in the clockwise direction, and the carrier 210 can alternatively rotate in the counter-clockwise direction.

Figure 9:
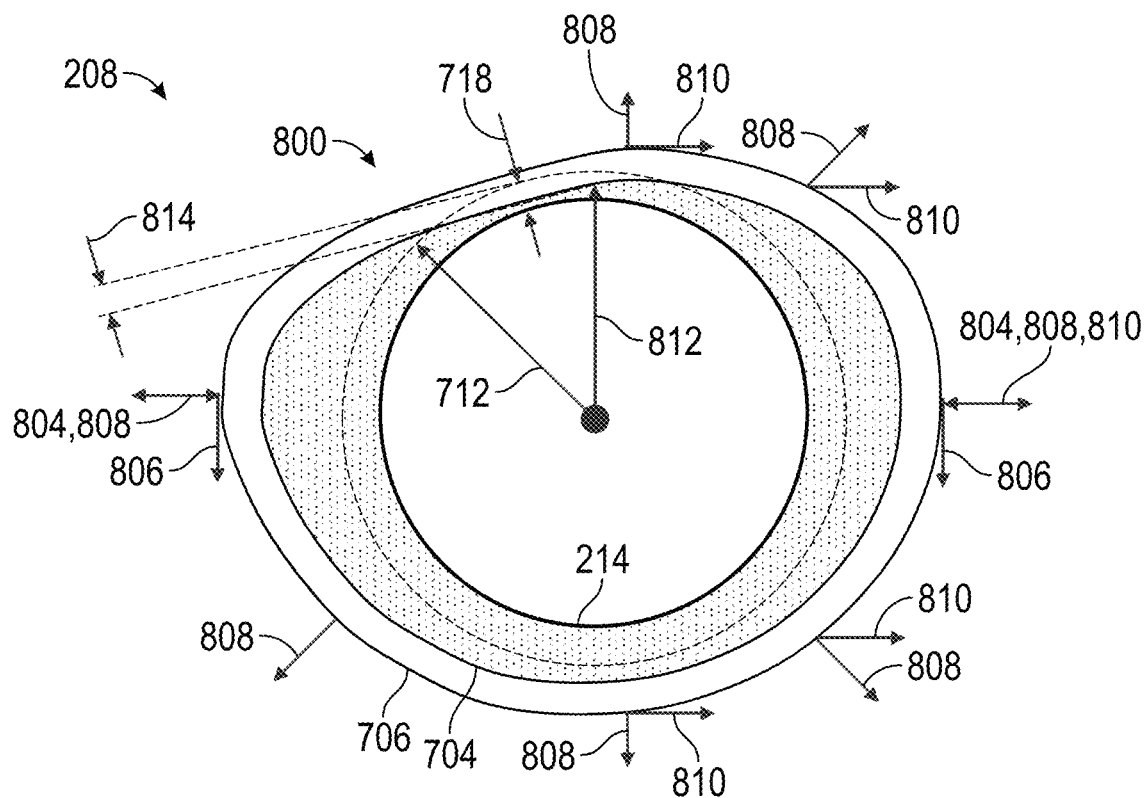
FIG. 9 shows a schematic diagram of the planet gear shown in FIG. 8 with the resultant tangential, radial, pinch, and centrifugal forces causing the planet gear rim to deform, according to one example.

FIG. 9 is a schematic diagram of the planet gear 208 with resultant radial, pinch, transverse, and centrifugal forces causing a deformation 800 of the planet gear rim 706. Torsion input from the LP shaft 36 (FIG. 1) causes the sun gear 206 (FIG. 7) to exert pinch component forces 804 and tangential component forces 806 on the planet gear rim 706. The pinch component forces 804 and the tangential component forces 806 are caused by the radial and tangential components, respectively, of the force exerted through the planet gear teeth 209 (FIG. 7) from the sun gear 206 on one side and from the ring gear 212 (FIG. 7) on the other side. The pinch component forces 804 are directed radially inwards at locations where the planet gear 208 contacts the sun gear 206 (FIG. 7) and the ring gear 212 (FIG. 7). The tangential component forces 806 are tangential to the planet gear rim 706 at locations where the planet gear 208 contacts the sun gear 206 (FIG. 7) and the ring gear 212 (FIG. 7).

Radial component forces 808 extend radially outwards from the center of the planet gear 208 resulting from a radial component of the force exerted on the planet gear 208 from the rotation of the planet gear 208 about the pin 214. Centrifugal component forces 810 are the forces resulting from the precession of the planet gear 208 about the sun gear 206 (FIG. 7). In some examples, the centrifugal component forces 810 are greater in magnitude than the pinch component forces 804 and the tangential component forces 806.

The resultant pinch component forces 804, tangential component forces 806, radial component forces 808, and centrifugal component forces 810 cause deformation 800 of the planet gear rim 706. The pinch component forces 804 inwardly deform the planet gear rim 706 towards the pin 214. The tangential component forces 806 elongate the planet gear rim 706 in a direction opposite the path of the planet gear 204. The radial component forces 408 deform the planet gear rim 706 in a radially outward direction. The centrifugal component forces 810 elongate the planet gear rim 706 in a direction radially outwards from the sun gear 206. The deformation 800 results in a clearance 718 between the outer surface of the pin 214 and the inner surface of the planet gear rim 706 being reduced by a change in clearance 814, which is a radial distance between the inner radius 712 and a deformed inner radius 812.

Enhanced performance of the gear assembly 204 can be achieved when the clearance 718 is greater than the change in clearance 814. In other words, enhanced results can be achieved when the planet gear rim 706 does not deform or bend such that the planet gear rim 706 contacts the surface of the pin 214 when resultant radial component forces 808, pinch component forces 804, tangential component forces 806, and centrifugal component forces 810 are exerted on the planet gear rim 706.

It is desirable to have the gear assembly 204 designed to maintain a minimum clearance 718 during high load condition for a gas turbine engine 10, such as during a take-off, as this beneficially minimizes metal-to-metal contact within the planet gear 208.

The inventors discovered that a minimum clearance can be maintained by identifying the specific conditions of the gas turbine engine 10 likely to cause a maximum deformation of the planet gear 208 and relating those conditions to gearbox design. The inventors discovered a relationship that enabled them to determine an appropriate sizing for the planet gear 208 (specifically, the location of the planet gear bending stress neutral axis radius ($r_p$) 708) for a given number of planet gears 208 and gear ratio, based on the loading conditions for the gearbox during a takeoff condition so that a minimum clearance can be maintained. The relation discovered, referred to by the inventors as a pin clearance parameter (PCP) with units of revolutions per minute (rpm), is given in (1):

$$PCP = \frac{K_1}{c_r} \frac{GR}{GR-2} r_p^2 \left[ K_2 r_p^3 \Omega_{fan}^3 - \frac{HP_{fan}}{N_p} \left( \frac{GR-2}{GR} \right)^2 \right] \quad (1)$$

wherein "$c_r$" is the clearance 718 of the pin 214 measured in inches, "GR" is the gear ratio defined as the ratio of the sum of the number of ring gear teeth 213 and sun gear teeth 207 divided by the number of sun gear teeth 207, "$r_p$" is the planet gear bending stress neutral axis radius 708 measured in inches, "$N_p$" is the number of planet gears 208, "$HP_{fan}$" is the fan power, measured in horsepower, of the gas turbine engine 10 based on takeoff conditions, and "$\Omega_{fan}$" is the fan speed, measured in rpm, of the gas turbine engine 10 at on takeoff conditions measured in rpm. A first constant, $K_1$, has a value of $1.96 \times 10^{-5}$ per horsepower-minute-inch ($hp^{-1} \cdot min^{-1} \cdot in^{-1}$). A second constant, $K_2$, has a value of $4.91 \times 10^{-9}$ horsepower-minutes cubed per cubic inch ($hp \cdot min^3/in^3$). The inventors found that if the following inequality was satisfied, a minimum clearance can be maintained during takeoff conditions:

$$0 \text{ rpm} \le PCP \le 3{,}334 \text{ rpm} \qquad (2)$$

In other examples, where a design space is more limited by engine architecture or gearbox design, the range in (2) can be greater than or equal to zero rpm and less than or equal to 3,000 rpm, greater than or equal to 48 rpm and less than or equal to 3,000 rpm, greater than or equal to 48 rpm and less than or equal to 1,334 rpm, or greater than or equal to 80 rpm and less than or equal to 1,300 rpm.

FIG. 10 discloses gear ratios, fan powers, fan speeds, numbers of gears, planet gear bending stress neutral axis radii 708, clearances 718, and pin clearance parameters for multiple exemplary gear assemblies 204.

FIG. 11 discloses units and exemplary ranges for gear ratios, fan powers, fan speeds, numbers of gears, planet gear bending stress neutral axis radii 708, clearances 718, and pin clearance parameters.

Further aspects of the present disclosure are provided by the subject matter of the following clauses.

A lubrication system for a gas turbine engine having a longitudinal centerline axis and one or more rotating components. The lubrication system comprises a primary lubrication system that supplies lubricant to the one or more rotating components during normal operation of the gas turbine engine, and an auxiliary lubrication system. The auxiliary lubrication system comprises an auxiliary reservoir that stores the lubricant therein, and a lubricant dispersion device that rotates about the longitudinal centerline axis, the lubricant dispersion device collecting the lubricant in the auxiliary reservoir and dispersing the lubricant to the one or more rotating components as the lubricant dispersion device rotates.

The lubrication system of the preceding clause, the gas turbine engine comprising a fan, a turbo-engine, an output shaft coupled to the fan, and an input shaft coupled to the turbo-engine.

The lubrication system of any clause herein, the lubricant dispersion device being drivingly coupled to at least one of the output shaft or the input shaft such that rotation of the at least one of the output shaft or the input shaft causes the lubricant dispersion device to rotate.

The lubrication system of any clause herein, the gas turbine engine comprising a gear assembly, the output shaft drivingly coupled to the input shaft through the gear assembly.

The lubrication system of the preceding clause, the gear assembly including a plurality of gears and one or more gearbox bearings.

The lubrication system of any clause herein, the one or more rotating components being at least one of the plurality of gears or the one or more gearbox bearings.

The lubrication system of any clause herein, the lubricant dispersion device being drivingly coupled to the gear assembly such that rotation of the gear assembly causes the lubricant dispersion device to rotate.

The lubrication system of any clause herein, the lubricant dispersion device being drivingly coupled to at least one of the output shaft, the input shaft, or the gear assembly.

The lubrication system of any clause herein, the auxiliary lubrication system comprising a lubricant dispersion device gear assembly, and the lubricant dispersion device being drivingly coupled to the at least one of the output shaft, the input shaft, or the gear assembly through the lubricant dispersion device gear assembly.

The lubrication system of any clause herein, the lubricant dispersion device gear assembly having a gear ratio such that a rotational speed of the lubricant dispersion device is greater than a rotational speed of the at least one of the output shaft, the input shaft, or the gear assembly.

The lubrication system of the preceding clause, the gear ratio being greater than or equal to 10:1 such that the rotational speed of the lubricant dispersion device is at least ten times greater than the rotational speed of the at least one of the output shaft, the input shaft, or the gear assembly.

The lubrication system of any clause herein, the lubricant dispersion device gear assembly including a first lubricant dispersion device gear coupled to the at least one of the output shaft, the input shaft, or the gear assembly, and a second lubricant dispersion device gear coupled to the lubricant dispersion device, the second lubricant dispersion device gear being intermeshed with the first lubricant dispersion device gear.

The lubrication system of any clause herein, the auxiliary lubrication system causing the lubricant dispersion device to rotate when the primary lubrication system is unable to supply the lubricant to the one or more rotating components.

The lubrication system of any clause herein, the auxiliary lubrication system preventing the lubricant dispersion device from rotating when the primary lubrication system is supplying the lubricant to the one or more rotating components.

The lubrication system of any clause herein, the auxiliary lubrication system causing the lubricant dispersion device to rotate based on at least one of the pressure of the lubricant in the primary lubrication system, a pressure of fuel in the gas turbine engine, or a pressure of hydraulics in the gas turbine engine.

The lubrication system of any clause herein, the auxiliary lubrication system causing the lubricant dispersion device to rotate when the at least one of the pressure of the lubricant in the primary lubrication system, the pressure of the fuel in the gas turbine engine, or the pressure of the hydraulics in the gas turbine engine is less than a primary pressure threshold.

The lubrication system of any clause herein, the auxiliary lubrication system preventing the lubricant dispersion device from rotating when the at least one of the pressure of the lubricant in the primary lubrication system, the pressure of the fuel in the gas turbine engine, or the pressure of the hydraulics in the gas turbine engine is greater than the primary pressure threshold.

The lubrication system of any clause herein, the auxiliary lubrication system causing the lubricant dispersion device to rotate based on a speed of the turbo-engine.

The lubrication system of any clause herein, the auxiliary lubrication system causing the lubricant dispersion device to rotate when the speed of the turbo-engine is less than a speed threshold.

The lubrication system of any clause herein, the auxiliary lubrication system preventing the lubricant dispersion device from rotating when the speed of the turbo-engine is greater than the speed threshold.

The lubrication system of any clause herein, the speed threshold being at least 5% of a maximum speed of the turbo-engine.

The lubrication system of any clause herein, the speed threshold being 5% to 10% of the maximum speed of the turbo-engine.

The lubrication system of any clause herein, the gas turbine engine further comprising a controller, and the auxiliary lubrication system causing the lubricant dispersion device to rotate when the controller turns off.

The lubrication system of any clause herein, the auxiliary lubrication system preventing the lubricant dispersion device from rotating when the controller turns on.

The lubrication system of any clause herein, the auxiliary lubrication system comprising a clutch that engages the lubricant dispersion device such that the lubricant dispersion device rotates or that disengages the lubricant dispersion device to prevent the lubricant dispersion device from rotating.

The lubrication system of any clause herein, the clutch engaging the lubricant dispersion device when the primary lubrication system is unable to supply the lubricant to the one or more rotating components.

The lubrication system of any clause herein, the clutch disengaging the lubricant dispersion device when the primary lubrication system is supplying the lubricant to the one or more rotating components.

The lubrication system of any clause herein, the clutch being a centrifugal clutch that engages or disengages the lubricant dispersion device based on the rotational speed of the least one of the output shaft, the input shaft, or the gear assembly.

The lubrication system of any clause herein, the clutch engaging the lubricant dispersion device when the rotational speed of the at least one of the output shaft, the input shaft, or the gear assembly is less than a rotational speed threshold.

The lubrication system of any clause herein, the clutch disengaging the lubricant dispersion device when the rotational speed of the at least one of the output shaft, the input shaft, or the gear assembly is greater than the rotational speed threshold.

The lubrication system of any clause herein, the clutch engaging or disengaging the lubricant dispersion device based on a pressure of the lubricant in the primary lubrication system.

The lubrication system of any clause herein, the clutch engaging the lubricant dispersion device when the pressure of the lubricant in the primary lubrication system is less than a primary pressure threshold.

The lubrication system of any clause herein, the clutch disengaging the lubricant dispersion device when the pressure of the lubricant in the primary lubrication system is greater than the primary pressure threshold.

The lubrication system of any clause herein, the clutch engaging or disengaging the lubricant dispersion device based on at least one of the pressure of the lubricant in the primary lubrication system, a pressure of fuel in the gas turbine engine, or a pressure of hydraulics in the gas turbine engine.

The lubrication system of any clause herein, the clutch engaging the lubricant dispersion device when the at least one of the pressure of the lubricant in the primary lubrication system, the pressure of the fuel in the gas turbine engine, or the pressure of the hydraulics in the gas turbine engine is less than a primary pressure threshold.

The lubrication system of any clause herein, the clutch disengaging the lubricant dispersion device when the at least one of the pressure of the lubricant in the primary lubrication system, the pressure of the fuel in the gas turbine engine, or the pressure of the hydraulics in the gas turbine engine is greater than the primary pressure threshold.

The lubrication system of any clause herein, the clutch engaging the lubricant dispersion device when the controller turns off.

The lubrication system of any clause herein, the clutch disengaging the lubricant dispersion device when the controller turns on.

The lubrication system of any clause herein, the auxiliary lubrication system comprising an auxiliary lubricant return line in fluid communication with the auxiliary reservoir and the primary lubrication system, the lubricant draining from the auxiliary reservoir to the primary lubrication system through the auxiliary lubricant return line.

The lubrication system of any clause herein, the primary lubrication system comprising a primary pump and a primary lubricant supply line, the primary pump pumping the lubricant to the one or more rotating components through the primary lubricant supply line.

The lubrication system of any clause herein, further comprising one or more tanks and a primary lubricant return line, the lubricant draining from the one or more rotating components to the one or more tanks through the primary lubricant return line during normal operation of the gas turbine engine.

The lubrication system of any clause herein, further comprising one or more drain valves in fluid communication with the primary lubrication system.

The lubrication system of any clause herein, the one or more drain valves opening to drain the lubricant from the one or more rotating components through the primary lubricant return line.

The lubrication system of any clause herein, the one or more drain valves closing to cause the lubricant to drain into the auxiliary reservoir.

The lubrication system of any clause herein, the gas turbine engine further comprising a fan shaft coupled to the fan, the output shaft being the fan shaft.

The lubrication system of any clause herein, the gas turbine engine further comprising a low-pressure shaft coupled to the turbo-engine, the input shaft being the low-pressure shaft.

The lubrication system of any clause herein, the gear assembly comprising a plurality of gears.

The lubrication system of any clause herein, the lubricant dispersion device being drivingly coupled to at least one of the plurality of gears.

The lubrication system of any clause herein, the gear assembly further comprising a planet carrier, the lubricant dispersion device being drivingly coupled to the planet carrier.

The lubrication system of any clause herein, the gear assembly further comprising a pin disposed through at least one of the plurality of gears, the lubricant dispersion device being drivingly coupled to the pin.

The lubrication system of any clause herein, the lubricant dispersion device being an annular disk that is annular about the longitudinal centerline axis.

The lubrication system of any clause herein, the lubricant dispersion device including a hub and a plurality of arms coupled to the hub.

The lubrication system of any clause herein, each of the plurality of arms including a scoop portion that scoops the lubricant in the auxiliary reservoir and disperses the lubricant to the one or more rotating components.

The lubrication system of any clause herein, the scoop portion of each of the plurality of arms having a generally crescent shape.

The lubrication system of any clause herein, the lubricant dispersion device rotating in a first rotational direction of the fan, and in a second rotational direction of the fan, the second rotational direction being opposite the first rotational direction.

A gas turbine engine comprising a fan, a turbo-engine, an output shaft coupled to the fan, an input shaft coupled to the turbo-engine, and the lubrication system of any clause herein.

A method of operating the lubrication system of any clause herein, the method comprising supplying the lubricant from the primary reservoir through the primary lubrication system to the one or more rotating components during normal operation of the gas turbine engine, draining the lubricant from the one or more rotating components into the auxiliary reservoir, collecting a portion of the lubricant with the lubricant dispersion device, and dispersing the portion of the lubricant to the one or more rotating components as the lubricant dispersion device rotates.

The method of the preceding clause, the gas turbine engine comprising a fan, a turbo-engine, an output shaft coupled to the fan, and an input shaft coupled to the turbo-engine.

The method of any clause herein, the lubricant dispersion device being drivingly coupled to at least one of the output shaft or the input shaft, and the method further comprising causing the lubricant dispersion device to rotate with rotation of the at least one of the output shaft or the input shaft.

The method of any clause herein, the gas turbine engine comprising a gear assembly, the output shaft drivingly coupled to the input shaft through the gear assembly.

The method of the preceding clause, the gear assembly including a plurality of gears and one or more gearbox bearings.

The method of any clause herein, the one or more rotating components being at least one of the plurality of gears or the one or more gearbox bearings.

The method of any clause herein, the lubricant dispersion device being drivingly coupled to the gear assembly, and the method further comprising causing the lubricant dispersion device to rotate with rotation of the gear assembly.

The method of any clause herein, the lubricant dispersion device being drivingly coupled to at least one of the output shaft, the input shaft, or the gear assembly.

The method of any clause herein, the auxiliary lubrication system comprising a lubricant dispersion device gear assembly, and the lubricant dispersion device being drivingly coupled to the at least one of the output shaft, the input shaft, or the gear assembly through the lubricant dispersion device gear assembly.

The method of any clause herein, the lubricant dispersion device gear assembly having a gear ratio such that a rotational speed of the lubricant dispersion device is greater than a rotational speed of the at least one of the output shaft, the input shaft, or the gear assembly.

The method of the preceding clause, the gear ratio being greater than or equal to 10:1 such that the rotational speed of the lubricant dispersion device is at least ten times greater than the rotational speed of the at least one of the output shaft, the input shaft, or the gear assembly.

The method of any clause herein, the lubricant dispersion device gear assembly including a first lubricant dispersion device gear coupled to the at least one of the output shaft, the input shaft, or the gear assembly, and a second lubricant dispersion device gear coupled to the lubricant dispersion device, the second lubricant dispersion device gear being intermeshed with the first lubricant dispersion device gear.

The method of any clause herein, further comprising rotating the lubricant dispersion device when the primary lubrication system is unable to supply the lubricant to the one or more rotating components.

The method of any clause herein, further comprising preventing the lubricant dispersion device from rotating when the primary lubrication system is supplying the lubricant to the one or more rotating components.

The method of any clause herein, further comprising rotating the lubricant dispersion device based on at least one of the pressure of the lubricant in the primary lubrication system, a pressure of fuel in the gas turbine engine, or a pressure of hydraulics in the gas turbine engine.

The method of any clause herein, further comprising rotating the lubricant dispersion device when the at least one of the pressure of the lubricant in the primary lubrication system, the pressure of the fuel in the gas turbine engine, or the pressure of the hydraulics in the gas turbine engine is less than a primary pressure threshold.

The method of any clause herein, further comprising preventing the lubricant dispersion device from rotating when the at least one of the pressure of the lubricant in the primary lubrication system, the pressure of the fuel in the gas turbine engine, or the pressure of the hydraulics in the gas turbine engine is greater than the primary pressure threshold.

The method of any clause herein, further comprising rotating the lubricant dispersion device based on a speed of the turbo-engine.

The method of any clause herein, further comprising rotating the lubricant dispersion device when the speed of the turbo-engine is less than a speed threshold.

The method of any clause herein, further comprising preventing the lubricant dispersion device from rotating when the speed of the turbo-engine is greater than the speed threshold.

The method of any clause herein, the speed threshold being at least 5% of a maximum speed of the turbo-engine.

The method of any clause herein, the speed threshold being 5% to 10% of the maximum speed of the turbo-engine.

The method of any clause herein, the gas turbine engine further comprising a controller, and the method further comprising rotating the lubricant dispersion device when the controller turns off.

The method of any clause herein, further comprising preventing the lubricant dispersion device from rotating when the controller turns on.

The method of any clause herein, the auxiliary lubrication system comprising a clutch, and the method further comprising engaging, with the clutch, the lubricant dispersion device such that the lubricant dispersion device rotates, and disengaging, with the clutch, the lubricant dispersion device to prevent the lubricant dispersion device from rotating.

The method of any clause herein, further comprising engaging the lubricant dispersion device with the clutch when the primary lubrication system is unable to supply the lubricant to the one or more rotating components.

The method of any clause herein, further comprising disengaging the lubricant dispersion device with the clutch when the primary lubrication system is supplying the lubricant to the one or more rotating components.

The method of any clause herein, the clutch being a centrifugal clutch, and the method further comprising engaging or disengaging the lubricant dispersion device with the clutch based on the rotational speed of the least one of the output shaft, the input shaft, or the gear assembly.

The method of any clause herein, further comprising engaging the lubricant dispersion device with the clutch when the rotational speed of the at least one of the output shaft, the input shaft, or the gear assembly is less than a rotational speed threshold.

The method of any clause herein, further comprising disengaging the lubricant dispersion device with the clutch when the rotational speed of the at least one of the output shaft, the input shaft, or the gear assembly is greater than the rotational speed threshold.

The method of any clause herein, further comprising engaging or disengaging the lubricant dispersion device with the clutch based on a pressure of the lubricant in the primary lubrication system.

The method of any clause herein, further comprising engaging the lubricant dispersion device with the clutch when the pressure of the lubricant in the primary lubrication system is less than a primary pressure threshold.

The method of any clause herein, further comprising disengaging the lubricant dispersion device with the clutch when the pressure of the lubricant in the primary lubrication system is greater than the primary pressure threshold.

The method of any clause herein, further comprising engaging or disengaging the lubricant dispersion device with the clutch based on at least one of the pressure of the lubricant in the primary lubrication system, a pressure of fuel in the gas turbine engine, or a pressure of hydraulics in the gas turbine engine.

The method of any clause herein, further comprising engaging the lubricant dispersion device with the clutch when the at least one of the pressure of the lubricant in the primary lubrication system, the pressure of the fuel in the gas turbine engine, or the pressure of the hydraulics in the gas turbine engine is less than a primary pressure threshold.

The method of any clause herein, further comprising disengaging the lubricant dispersion device with the clutch when the at least one of the pressure of the lubricant in the primary lubrication system, the pressure of the fuel in the gas turbine engine, or the pressure of the hydraulics in the gas turbine engine is greater than the primary pressure threshold.

The method of any clause herein, further comprising engaging the lubricant dispersion device with the clutch when the controller turns off.

The method of any clause herein, further comprising disengaging the lubricant dispersion device with the clutch when the controller turns on.

The method of any clause herein, the auxiliary lubrication system comprising an auxiliary lubricant return line in fluid communication with the auxiliary reservoir and the primary lubrication system, and the method further comprising draining the lubricant from the auxiliary reservoir to the primary lubrication system through the auxiliary lubricant return line.

The method of any clause herein, the primary lubrication system comprising a primary pump and a primary lubricant supply line, and the method further comprising pumping, with the primary pump, the lubricant to the one or more rotating components through the primary lubricant supply line.

The method of any clause herein, the lubrication system further comprising one or more tanks and a primary lubricant return line, and the method further comprising draining the lubricant from the one or more rotating components to the one or more tanks through the primary lubricant return line during normal operation of the gas turbine engine.

The method of any clause herein, the lubrication system further comprising one or more drain valves in fluid communication with the primary lubricant return line, and the method further comprising opening the one or more drain valves to drain the lubricant from the one or more rotating components through the primary lubricant return line.

The method of any clause herein, further comprising closing the one or more drain valves to cause the lubricant to drain into the auxiliary reservoir.

The method of any clause herein, the gas turbine engine further comprising a fan shaft coupled to the fan, the output shaft being the fan shaft.

The method of any clause herein, the gas turbine engine further comprising a low-pressure shaft coupled to the turbo-engine, the input shaft being the low-pressure shaft.

The method of any clause herein, the gear assembly comprising a plurality of gears.

The method of any clause herein, the lubricant dispersion device being drivingly coupled to at least one of the plurality of gears.

The method of any clause herein, the gear assembly further comprising a planet carrier, the lubricant dispersion device being drivingly coupled to the planet carrier.

The method of any clause herein, the gear assembly further comprising a pin disposed through at least one of the plurality of gears, the lubricant dispersion device being drivingly coupled to the pin.

The method of any clause herein, the lubricant dispersion device being an annular disk that is annular about the longitudinal centerline axis.

The method of any clause herein, the lubricant dispersion device including a hub and a plurality of arms coupled to the hub.

The method of any clause herein, each of the plurality of arms including a scoop portion, and the method further comprising scooping the lubricant in the auxiliary reservoir with the scoop portion, and dispersing the lubricant to the one or more rotating components with the scoop portion.

The method of any clause herein, the scoop portion of each of the plurality of arms having a generally crescent shape.

The method of any clause herein, further comprising rotating the lubricant dispersion device in a first rotational direction of the fan, and rotating the lubricant dispersion device in a second rotational direction of the fan, the second rotational direction being opposite the first rotational direction.

A gas turbine engine comprising: an epicyclic gear train mechanically coupled to an LP shaft of the gas turbine engine, wherein the epicyclic gear train comprises a sun gear, a ring gear, a carrier, and a plurality of planet gears arranged in a planetary configuration, wherein each of the plurality of planet gears comprises: a pin comprising a pin outer surface; an annular planet gear rim comprising an inner surface, wherein the inner surface and the pin outer surface define a clearance, wherein the clearance is greater than zero when a radial component force, a pinch component force, a tangential component force, and a centrifugal component force are applied to the planet gear; a planet gear bending stress neutral axis radius, wherein the planet gear bending stress neutral axis radius is a radius where stresses and strains within the annular planet gear rim are zero when the radial component force, the pinch component force, the tangential component force, and the centrifugal component force are applied to the planet gear; and a pin clearance parameter defined by:

$$PCP = \frac{K_1}{c_r} \frac{GR}{GR-2} r_p^2 \left[ K_2 r_p^3 \Omega_{fan}^3 - \frac{HP_{fan}}{N_p} \left( \frac{GR-2}{GR} \right)^2 \right]$$

wherein "PCP" is the pin clearance parameter in rpm, "$c_r$" is the clearance in inches, "GR" is a gear ratio of the epicyclic gear train, "$r_p$" is the planet gear bending stress neutral axis radius in inches, "$N_p$" is a number of the plurality of planet gears, "$HP_{fan}$" is a fan power of the gas turbine engine in horsepower at takeoff conditions, "$\Omega_{fan}$" is a fan speed of the gas turbine engine in rpm at takeoff conditions, $K_1$ is a first constant of $1.9 \times 10^{-5}$ per horsepower-minute-inch, and $K_2$ is a second constant of $4.91 \times 10^{-9}$ horsepower-minutes cubed per cubic inch, and wherein the pin clearance parameter is greater than or equal to zero rpm and less than or equal to 3,334 rpm.

The gas turbine engine of any clause herein, wherein the sun gear further comprises a plurality of sun gear teeth, the ring gear further comprises a plurality of ring gear teeth, and the gear ratio of the epicyclic gear train is a sum of the number of the plurality of ring gear teeth and the number of the plurality of sun gear teeth divided by the number of the plurality of sun gear teeth.

The gas turbine engine of any clause herein, wherein the pin clearance parameter includes values in a range from zero rpm to 3,000 rpm.

The gas turbine engine of any clause herein, wherein the pin clearance parameter includes values in a range from 48 rpm to 1,334 rpm.

The gas turbine engine of any clause herein, wherein the pin clearance parameter includes values in a range from 80 rpm to 1,300 rpm.

The gas turbine engine of any clause herein, wherein the gas turbine engine is configured to produce the fan power in a range from 7,000 horsepower to 80,000 horsepower at takeoff conditions.

The gas turbine engine of any clause herein, wherein the gas turbine engine is configured to produce the fan speed in a range from 1,600 rpm to 3,334 rpm at takeoff conditions.

The gas turbine engine of any clause herein, wherein the number of the plurality of planet gears is three, four, five, or six.

The gas turbine engine of any clause herein, wherein the gas turbine engine has a bypass ratio in a range from 12 to 15.

The gas turbine engine of any clause herein, wherein the gas turbine engine further comprises a HP compressor disposed aft of the epicyclic gear train, wherein the HP compressor comprises eight, nine, or ten HP compressor stages.

The gas turbine engine of any clause herein, wherein the gas turbine engine further comprises a LP turbine coupled to the LP shaft and comprising a plurality of LP turbine stages, wherein the number of the plurality of LP turbine stages is three, four, five, or six.

The gas turbine engine of any clause herein, wherein the gas turbine engine further comprises: a fan shaft coupled to the carrier of the epicyclic gear train; and a fan coupled to the fan shaft, wherein the fan comprises a fan diameter that ranges from 80 inches to 95 inches.

The gas turbine engine of any clause herein, wherein the fan diameter ranges from 85 inches to 90 inches.

The gas turbine engine of any clause herein, wherein each of the plurality of planet gears further comprises a bearing, and wherein the annular planet gear rim is disposed circumferentially around the bearing.

The gas turbine engine of any clause herein, wherein the bearing comprises a journal bearing.

A gas turbine engine can include a gear assembly mechanically coupled to an LP shaft of the gas turbine engine. The gear assembly can include a sun gear, a ring gear, a carrier, and a plurality of planet gears arranged in a planetary configuration. Each of the plurality of planet gears can include a pin with a pin outer surface, a gearbox bearing disposed within the planet gear and at least partially surrounding the pin, an annular planet gear rim with an inner surface, and a planet gear bending stress neutral axis radius. The planet gear bending stress neutral axis radius is a radius where stresses and strains within the annular planet gear rim are zero when the radial component force, the pinch component force, the tangential component force, and the centrifugal component force are applied to the planet gear. The inner surface and the pin outer surface define a clearance, wherein the clearance can be greater than zero when a radial component force, a pinch component force, a tangential component force, and a centrifugal component force are applied to the planet gear. Each of the plurality of planet gears can further include a pin clearance parameter defined by:

$$PCP = \frac{K_1}{c_r} \frac{GR}{GR-2} r_p^2 \left[ K_2 r_p^3 \Omega_{fan}^3 - \frac{HP_{fan}}{N_p} \left( \frac{GR-2}{GR} \right)^2 \right]$$

wherein "PCP" is the pin clearance parameter in rpm, "$c_r$" is the clearance in inches, "GR" is a gear ratio of the epicyclic gear train, "$r_p$" is the planet gear bending stress neutral axis radius in inches, "$N_p$" is a number of the plurality of planet gears, "$HP_{fan}$" is a fan power of the gas turbine engine in horsepower at takeoff conditions, "$\Omega_{fan}$" is a fan speed of the gas turbine engine in rpm at takeoff conditions, $K_1$ is a first constant of $1.96 \times 10^{-5}$ per horsepower-minute-inch, and $K_2$ is a second constant of $4.91 \times 10^{-9}$ horsepower-minutes cubed per cubic inch. The pin clearance parameter can be greater than or equal to zero rpm and less than or equal to 3,334 rpm. The gas turbine engine can further include a lubrication system with a primary lubrication system and an auxiliary lubrication system. The primary lubrication system can supply a lubricant to the gearbox bearing of at least one of the plurality of planet gears during normal operation of the gas turbine engine. The auxiliary lubrication system can include an auxiliary reservoir that stores the lubricant therein and a lubricant dispersion device that rotates about a longitudinal centerline axis of the gas turbine engine. The lubricant dispersion device can collect the lubricant in the auxiliary reservoir and disperse the lubricant to the gearbox bearing of at least one of the plurality of planet gears as the lubricant dispersion device rotates.

The gas turbine engine of any clause herein, wherein the sun gear can further include a plurality of sun gear teeth, the ring gear can further include a plurality of ring gear teeth, the gear ratio of the gear assembly is a sum of the number of the plurality of ring gear teeth and the number of the plurality of sun gear teeth divided by the number of the plurality of sun gear teeth, and wherein the primary lubrication system can include a primary pump and a primary lubricant supply line, the primary pump pumping the lubricant to the gearbox bearing through the primary lubricant supply line.

The gas turbine engine of any clause herein, wherein the pin clearance parameter can include values in a range from zero rpm to 3,000 rpm.

The gas turbine engine of any clause herein, wherein the pin clearance parameter can include values in a range from 48 rpm to 1,334 rpm.

The gas turbine engine of any clause herein, wherein the pin clearance parameter can include values in a range from 80 rpm to 1,300 rpm, and wherein the auxiliary lubrication system can include a lubricant dispersion device gear assembly drivingly coupling the lubricant dispersion device to the gear assembly.

The gas turbine engine of any clause herein, wherein the gas turbine engine can be configured to produce the fan power in a range from 7,000 horsepower to 80,000 horsepower at takeoff conditions.

The gas turbine engine of any clause herein, wherein the gas turbine engine can be configured to produce the fan speed in a range from 1,600 rpm to 3,334 rpm at takeoff conditions, and wherein the auxiliary lubrication system can include a clutch that engages the lubricant dispersion device.

The gas turbine engine of any clause herein, wherein the number of the plurality of planet gears can be three, four, five, or six.

The gas turbine engine of any clause herein, wherein the gas turbine engine can have a bypass ratio in a range from 12 to 15.

The gas turbine engine of any clause herein, wherein the gas turbine engine can further include a HP compressor disposed aft of the gear assembly, wherein the HP compressor can include eight, nine, or ten HP compressor stages.

The gas turbine engine of any clause herein, wherein the gas turbine engine can further include a LP turbine coupled to the LP shaft and comprising a plurality of LP turbine stages, wherein the number of the plurality of LP turbine stages can be three, four, five, or six.

The gas turbine engine of any clause herein, wherein the gas turbine engine can further include a fan shaft coupled to the carrier of the gear assembly and a fan coupled to the fan shaft, wherein the fan can have a fan diameter that ranges from 80 inches to 95 inches.

The gas turbine engine of any clause herein, wherein the fan diameter can range from 85 inches to 90 inches.

The gas turbine engine of any clause herein, wherein the gearbox bearing can include a journal bearing.

The gas turbine engine of any clause herein, wherein the primary lubrication system can include a primary pump and a primary lubricant supply line, the primary pump pumping the lubricant to the gearbox bearing of at least one of the plurality of planet gears through the primary lubricant supply line.

The gas turbine engine of any clause herein, further including one or more drain valves in fluid communication with the primary lubrication system, the one or more drain valves closing to cause the lubricant to drain into the auxiliary reservoir.

The gas turbine engine of any clause herein, wherein the auxiliary lubrication system can include a lubricant dispersion device gear assembly drivingly coupling the lubricant dispersion device to the gear assembly, and wherein the gear ratio of the gear assembly can be in a range from 2.5 to 5.

The gas turbine engine of any clause herein, wherein the lubricant dispersion device gear assembly can have a gear ratio such that a rotational speed of the lubricant dispersion device is greater than a rotational speed of the gear assembly, and wherein the gear ratio of the gear assembly can be in a range from 3.2 to 4.

The gas turbine engine of any clause herein, wherein the auxiliary lubrication system can include a clutch that engages the lubricant dispersion device such that the lubricant dispersion device rotates or that disengages the lubricant dispersion device to prevent the lubricant dispersion device from rotating.

The gas turbine engine of any clause herein, wherein the clutch can engage the lubricant dispersion device when the primary lubrication system is unable to supply the lubricant to the gearbox bearing of at least one of the plurality of planet gears.

The gas turbine engine of any clause herein, wherein the clutch can disengage the lubricant dispersion device when the primary lubrication system is supplying the lubricant to the gearbox bearing of at least one of the plurality of planet gears.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A gas turbine engine comprising:
a gear assembly mechanically coupled to an LP shaft of the gas turbine engine, wherein the gear assembly comprises a sun gear, a ring gear, a carrier, and a plurality of planet gears arranged in a planetary configuration, wherein each of the plurality of planet gears comprises:
a pin comprising a pin outer surface;
a gearbox bearing disposed within the planet gear and at least partially surrounding the pin;
an annular planet gear rim comprising an inner surface, wherein the inner surface and the pin outer surface define a clearance, wherein the clearance is greater than zero when a radial component force, a pinch component force, a tangential component force, and a centrifugal component force are applied to the planet gear;
a planet gear bending stress neutral axis radius, wherein the planet gear bending stress neutral axis radius is a radius where stresses and strains within the annular planet gear rim are zero when the radial component force, the pinch component force, the tangential component force, and the centrifugal component force are applied to the planet gear; and
a pin clearance parameter defined by:

$$PCP = \frac{K_1}{c_r} \frac{GR}{GR-2} r_p^2 \left[ K_2 r_p^3 \Omega_{fan}^3 - \frac{HP_{fan}}{N_p} \left( \frac{GR-2}{GR} \right)^2 \right]$$

wherein "PCP" is the pin clearance parameter in rpm, "$c_r$" is the clearance in inches, "GR" is a gear ratio of the epicyclic gear train, "$r_p$" is the planet gear bending stress neutral axis radius in inches, "$N_p$" is a number of the plurality of planet gears, "$HP_{fan}$" is a fan power of the gas turbine engine in horsepower at takeoff conditions, "$\Omega_{fan}$" is a fan speed of the gas turbine engine in rpm at takeoff conditions, $K_1$ is a first constant of $1.96 \times 10^{-5}$ per horsepower-minute-inch, and $K_2$ is a second constant of $4.91 \times 10^{-9}$ horsepower-minutes cubed per cubic inch, and wherein the pin clearance parameter is greater than or equal to zero rpm and less than or equal to 3,334 rpm; and a lubrication system comprising:
   a primary lubrication system configured to supply a lubricant to the gearbox bearing of at least one of the plurality of planet gears during normal operation of the gas turbine engine; and
   an auxiliary lubrication system comprising:
      an auxiliary reservoir that stores the lubricant therein; and
      a lubricant dispersion device that rotates about a longitudinal centerline axis of the gas turbine engine, the lubricant dispersion device collecting the lubricant in the auxiliary reservoir and dispersing the lubricant to the gearbox bearing of at least one of the plurality of planet gears as the lubricant dispersion device rotates.

2. The gas turbine engine of claim 1, wherein:
the sun gear further comprises a plurality of sun gear teeth,
the ring gear further comprises a plurality of ring gear teeth,
the gear ratio of the gear assembly is a sum of the number of the plurality of ring gear teeth and the number of the plurality of sun gear teeth divided by the number of the plurality of sun gear teeth, and
wherein the primary lubrication system comprises a primary pump and a primary lubricant supply line, the primary pump pumping the lubricant to the gearbox bearing through the primary lubricant supply line.

3. The gas turbine engine of claim 1, wherein the pin clearance parameter includes values in a range from zero rpm to 3,000 rpm.

4. The gas turbine engine of claim 1, wherein the pin clearance parameter includes values in a range from 48 rpm to 1,334 rpm.

5. The gas turbine engine of claim 1, wherein the pin clearance parameter includes values in a range from 80 rpm to 1,300 rpm, and wherein the auxiliary lubrication system comprises a lubricant dispersion device gear assembly drivingly coupling the lubricant dispersion device to the gear assembly.

6. The gas turbine engine of claim 1, wherein the gas turbine engine is configured to produce the fan power in a range from 7,000 horsepower to 80,000 horsepower at takeoff conditions.

7. The gas turbine engine of claim 1, wherein the gas turbine engine is configured to produce the fan speed in a range from 1,600 rpm to 3,334 rpm at takeoff conditions, and wherein the auxiliary lubrication system comprises a clutch that engages the lubricant dispersion device.

8. The gas turbine engine of claim 1, wherein the number of the plurality of planet gears is three, four, five, or six.

9. The gas turbine engine of claim 1, wherein the gas turbine engine has a bypass ratio in a range from 12 to 15.

10. The gas turbine engine of claim 1, wherein the gas turbine engine further comprises a HP compressor disposed aft of the gear assembly, wherein the HP compressor comprises eight, nine, or ten HP compressor stages.

11. The gas turbine engine of claim 1, wherein the gas turbine engine further comprises a LP turbine coupled to the LP shaft and comprising a plurality of LP turbine stages, wherein the number of the plurality of LP turbine stages is three, four, five, or six.

12. The gas turbine engine of claim 1, wherein the gas turbine engine further comprises:
a fan shaft coupled to the carrier of the gear assembly; and
a fan coupled to the fan shaft, wherein the fan comprises a fan diameter that ranges from 80 inches to 95 inches.

13. The gas turbine engine of claim 12, wherein the fan diameter ranges from 85 inches to 90 inches.

14. The gas turbine engine of claim 1, wherein the gearbox bearing comprises a journal bearing.

15. The gas turbine engine of claim 1, further comprising one or more drain valves in fluid communication with the primary lubrication system, the one or more drain valves closing to cause the lubricant to drain into the auxiliary reservoir.

16. The gas turbine engine of claim 1, wherein the auxiliary lubrication system comprises a lubricant dispersion device gear assembly drivingly coupling the lubricant dispersion device to the gear assembly, and wherein the gear ratio of the gear assembly is in a range from 2.5 to 5.

17. The gas turbine engine of claim 16, wherein the lubricant dispersion device gear assembly has a gear ratio such that a rotational speed of the lubricant dispersion device is greater than a rotational speed of the gear assembly, and wherein the gear ratio of the gear assembly is in a range from 3.2 to 4.

18. The gas turbine engine of claim 1, wherein the auxiliary lubrication system comprises a clutch that engages the lubricant dispersion device such that the lubricant dispersion device rotates or that disengages the lubricant dispersion device to prevent the lubricant dispersion device from rotating.

19. The gas turbine engine of claim 18, wherein the clutch engages the lubricant dispersion device when the primary lubrication system is unable to supply the lubricant to the gearbox bearing of at least one of the plurality of planet gears.

20. The lubrication system of claim 19, wherein the clutch disengages the lubricant dispersion device when the primary lubrication system is supplying the lubricant to the gearbox bearing of at least one of the plurality of planet gears.

* * * * *